(12) United States Patent
DiCarlo et al.

(10) Patent No.: US 9,958,667 B2
(45) Date of Patent: May 1, 2018

(54) APPARATUS, SYSTEM, AND METHOD FOR A MOUNTING SHOE WITH LOCKING PROJECTION

(71) Applicant: Robert J. McCreight, Jr., San Antonio, TX (US)

(72) Inventors: Joseph A. DiCarlo, Chester, NH (US); Robert J. McCreight, Jr., San Antonio, TX (US)

(73) Assignee: Robert J. McCreight, Jr., San Antonio, TX (US)

( * ) Notice: Subject to any disclaimer, the term of this patent is extended or adjusted under 35 U.S.C. 154(b) by 53 days.

(21) Appl. No.: 15/161,550

(22) Filed: May 23, 2016

(65) Prior Publication Data

US 2016/0369942 A1  Dec. 22, 2016

Related U.S. Application Data

(60) Provisional application No. 62/180,737, filed on Jun. 17, 2015.

(51) Int. Cl.
  *F16M 13/02* (2006.01)
  *G02B 23/12* (2006.01)
  *G02B 23/16* (2006.01)
  *A42B 3/04* (2006.01)
  *F16M 11/04* (2006.01)

(52) U.S. Cl.
  CPC ............. *G02B 23/16* (2013.01); *A42B 3/042* (2013.01); *F16M 11/041* (2013.01); *G02B 23/125* (2013.01)

(58) Field of Classification Search
  CPC ...... F16M 13/02; A42B 3/042; G02B 23/125; G02B 23/16
  USPC ........ 248/187.1, 177.1, 311.2; 396/419, 425; 359/815, 822, 694
  See application file for complete search history.

(56) References Cited

U.S. PATENT DOCUMENTS

| | | |
|---|---|---|
| 3,628,761 A | 12/1971 | Thomas, Jr. |
| 4,449,787 A | 5/1984 | Burbo et al. |
| 4,570,887 A * | 2/1986 | Banister ............... F16M 11/041 248/187.1 |
| 4,899,479 A | 2/1990 | Sanders |
| 4,929,973 A | 5/1990 | Nakatani |
| 5,236,169 A | 8/1993 | Johnsen |
| 5,307,204 A | 4/1994 | Dor |
| 5,331,459 A * | 7/1994 | Dor ........................ G02B 23/12 359/409 |
| 5,339,464 A | 8/1994 | Dor |
| 5,388,359 A | 2/1995 | DeWitt |
| D358,830 S | 5/1995 | Dor |
| 5,707,036 A | 1/1998 | Dunbar |
| 5,914,816 A | 6/1999 | Soto et al. |
| 6,019,329 A | 2/2000 | Edelstein |
| 6,196,504 B1 * | 3/2001 | Lemke ................. F16M 11/041 248/187.1 |

(Continued)

*Primary Examiner* — Tan Le
(74) *Attorney, Agent, or Firm* — Hayes Soloway P.C.

(57) ABSTRACT

An apparatus, system, and method for a mounting shoe with a locking projection is disclosed. A mounting shoe has a shoe body. A base is connected to a bottom of the shoe body, the base having a channel formed through the base between a first side and a second side. A locking projection is removably positioned within a hole positioned through the shoe body and the base, wherein the hole extends from a top surface of the shoe body to a ceiling of the channel.

19 Claims, 20 Drawing Sheets

(56) References Cited

U.S. PATENT DOCUMENTS

| | | |
|---|---|---|
| 6,457,179 B1 | 10/2002 | Prendergast |
| 6,472,776 B1 | 10/2002 | Soto et al. |
| D483,650 S | 12/2003 | Squillante et al. |
| 6,751,810 B1 | 6/2004 | Prendergast |
| 6,773,172 B1 | 8/2004 | Johnson et al. |
| 6,779,288 B1 | 8/2004 | Kim |
| 6,811,348 B1 | 11/2004 | Meyer et al. |
| 6,862,748 B2 | 3/2005 | Prendergast |
| 6,938,276 B1 | 9/2005 | Prendergast |
| 6,957,449 B2 | 10/2005 | Prendergast |
| 6,986,162 B2 | 1/2006 | Soto et al. |
| 7,117,624 B2 | 10/2006 | Kim |
| 7,219,370 B1 | 5/2007 | Teetzel et al. |
| 7,302,808 B1 | 12/2007 | Teetzel et al. |
| 7,418,738 B2 | 9/2008 | Prendergast |
| 7,444,683 B2 | 11/2008 | Prendergast et al. |
| 7,504,918 B2 | 3/2009 | Prendergast et al. |
| 7,520,083 B2 | 4/2009 | Dextraze |
| 7,647,927 B2 | 1/2010 | Teetzel et al. |
| 7,649,701 B2 | 1/2010 | Prendergast et al. |
| 7,658,556 B2 | 2/2010 | Johnson |
| 7,685,759 B2 | 3/2010 | Teetzel |
| 7,694,450 B2 | 4/2010 | Keng |
| 7,712,241 B2 | 5/2010 | Teetzel et al. |
| 7,735,159 B2 | 6/2010 | Prendergast |
| 7,765,730 B2 | 8/2010 | Keng |
| 7,797,875 B1 | 9/2010 | Carrier et al. |
| 7,802,392 B2 | 9/2010 | Peterson et al. |
| 7,814,698 B2 | 10/2010 | Fluhr et al. |
| 7,819,547 B1 | 10/2010 | Teetzel et al. |
| 7,823,316 B2 | 11/2010 | Storch et al. |
| 7,841,120 B2 | 11/2010 | Teetzel et al. |
| 7,866,083 B2 | 1/2011 | Teetzel |
| 7,996,917 B2 | 8/2011 | Prendergast |
| 8,011,629 B2 | 9/2011 | Herskovic |
| 8,020,335 B2 | 9/2011 | Larsson et al. |
| 8,047,118 B1 | 11/2011 | Teetzel et al. |
| 8,091,265 B1 | 1/2012 | Teetzel et al. |
| 8,100,044 B1 | 1/2012 | Teetzel et al. |
| 8,112,933 B1 | 2/2012 | Swan |
| 8,113,198 B2 | 2/2012 | Teetzel et al. |
| 8,209,780 B1 | 7/2012 | Lemire |
| 8,220,664 B1 | 7/2012 | Teetzel et al. |
| 8,220,946 B1 | 7/2012 | Teetzel |
| 8,230,636 B1 | 7/2012 | Swan |
| 8,238,045 B2 | 8/2012 | Prendergast et al. |
| 8,239,971 B2 | 8/2012 | Prendergast |
| 8,297,173 B1 | 10/2012 | Teetzel et al. |
| 8,305,685 B2 | 11/2012 | Heine et al. |
| 8,336,246 B1 | 12/2012 | Barber |
| 8,337,036 B2 | 12/2012 | Soto et al. |
| 8,375,473 B2 | 2/2013 | Celona et al. |
| 8,397,423 B2 | 3/2013 | Robinson |
| 8,490,316 B2 | 7/2013 | Kincel et al. |
| 8,531,592 B2 | 9/2013 | Teetzel et al. |
| 8,561,518 B2 | 10/2013 | Teetzel et al. |
| 8,661,571 B1 | 3/2014 | Teetzel et al. |
| 8,739,313 B2 | 6/2014 | Teetzel et al. |
| 8,800,194 B2 | 8/2014 | Teetzel et al. |
| 8,826,463 B2 | 9/2014 | Teetzel et al. |
| 8,857,097 B2 | 10/2014 | Rorick |
| 8,935,872 B2 | 1/2015 | Collin et al. |
| 9,129,544 B2 * | 9/2015 | Saitoh ............... G09G 3/20 |
| 9,696,611 B2 * | 7/2017 | Johnson, Sr. ........ G03B 17/561 |
| 2005/0241206 A1 | 11/2005 | Teetzel et al. |
| 2007/0214551 A1 | 9/2007 | Teetzel et al. |
| 2008/0107414 A1 * | 5/2008 | Showalter ............ F41G 11/004 |
| | | 396/429 |
| 2008/0134562 A1 | 6/2008 | Teetzel |
| 2008/0168696 A1 | 7/2008 | Orne et al. |
| 2008/0170838 A1 | 7/2008 | Teetzel et al. |
| 2009/0135505 A1 | 5/2009 | Willey |
| 2010/0224193 A1 | 9/2010 | Teetzel et al. |
| 2010/0299814 A1 | 12/2010 | Celona et al. |
| 2011/0145981 A1 | 6/2011 | Teetzel et al. |
| 2011/0239354 A1 | 10/2011 | Celona et al. |
| 2012/0006719 A1 | 1/2012 | Celona et al. |
| 2012/0043381 A1 | 2/2012 | Teetzel et al. |
| 2012/0138059 A1 | 6/2012 | Teetzel et al. |
| 2012/0145864 A1 * | 6/2012 | Vogt .................... F16M 11/041 |
| | | 248/316.2 |
| 2013/0083391 A1 | 4/2013 | Teetzel et al. |
| 2013/0086722 A1 | 4/2013 | Teetzel et al. |
| 2013/0318852 A1 | 12/2013 | Teetzel et al. |
| 2014/0237708 A1 | 8/2014 | DiCarlo |
| 2014/0239146 A1 | 8/2014 | DiCarlo |
| 2014/0245523 A1 | 9/2014 | Teetzel et al. |
| 2014/0345181 A1 | 11/2014 | Teetzel et al. |
| 2015/0253563 A1 | 9/2015 | DiCarlo |
| 2016/0369942 A1 * | 12/2016 | DiCarlo ................ A42B 3/042 |
| 2017/0248389 A1 * | 8/2017 | DiCarlo ................ F41G 11/003 |

\* cited by examiner

200

```
┌─────────────────────────────────────────────────┐
│  An optical device having a metal chassis is    │
│  provided, wherein a metal plate is attached    │
│  to the metal chassis                           │
└─────────────────────────────────────────────────┘
                         │
┌─────────────────────────────────────────────────┐
│  A shoe body and a base connected to a bottom   │
│  of the shoe body are mounted to the metal      │
│  plate by slidably engaging rail edges of the   │
│  metal plate with a channel formed through      │
│  the base between a first side and a second     │
│  side                                           │
└─────────────────────────────────────────────────┘
                         │
┌─────────────────────────────────────────────────┐
│  The shoe body and the base are locked to the   │
│  metal plate by engaging a locking projection   │
│  with the metal plate, wherein the locking      │
│  projection is positioned within a hole         │
│  positioned through the shoe body and the base, │
│  wherein the hole extends from a top surface of │
│  the shoe body to a ceiling of the channel,     │
│  whereby the shoe body and base are prevented   │
│  from moving in a direction along a length of   │
│  the rail edges                                 │
└─────────────────────────────────────────────────┘
```

*Fig. 14*

APPARATUS, SYSTEM, AND METHOD FOR A MOUNTING SHOE WITH LOCKING PROJECTION

CROSS REFERENCE TO RELATED APPLICATION

This application claims benefit of U.S. Provisional Application Ser. No. 62/180,737 filed Jun. 17, 2015, entitled, "Mounting Shoe with Biased Lever and Related Methods Thereof" the entire disclosure of which is incorporated herein by reference.

FIELD OF THE DISCLOSURE

The present disclosure is generally related to mounting devices and more particularly is related to an apparatus, system, and method for a mounting shoe with locking projection and related methods thereof.

BACKGROUND OF THE DISCLOSURE

Optical devices are commonly used in various environments to enhance the capabilities of the user's vision. In military environments, various optical devices are used to give a soldier enhanced visibility in harsh conditions. For example, devices like night vision monoculars are commonly used in the military to enhance a soldier's visibility in low light conditions. These optical devices are affixed to combat helmets, weapons, or other structures that a soldier uses, and during a field operation, a soldier may move the optical device between the various mounting structures.

The use of a shoe to secure an optical device to a mounting structure, such as a combat helmet or a weapon, is well-known in the art. FIGS. 1-3 are illustrations of an optical device mounting system, in accordance with the prior art. As is shown, the optical device 10 has a mounting shoe 20 secured thereto, such as with fastener 22. A pocket 30 is formed within the mounting shoe 20 (FIG. 1). The mounting shoe 20 engages with a receiver 40 of a mounting structure 50, as may be positioned on a combat helmet or weapon. A locking arm 60 protrudes into the receiver 40 such that when the mounting shoe 20 is engaged with the receiver 40, the locking arm 60 engages with the pocket 30 to securely retain the mounting shoe 20 within the receiver 40. To disengage the mounting shoe 20 from the receiver 40, the locking arm 60 may be withdrawn from engagement with the pocket 30, such as with buttons 70.

The optical device mounting system shown in FIGS. 1-3 is one type of mounting system—many others exist within the art. The shoe may have various designs, depending on the mounting structure the optical device is mounted to, and it is beneficial for the various designs of the shoe to be interchangeable with different mounts. There are two main types of conventional shoes: a shoe for engagement with a butterfly clip commonly used to mount optical devices to weapons; and a shoe with a pocket, commonly used to mount optical devices to a combat helmet. Both types of conventional shoes are static, unitary structures with a dovetail shape and a plurality of angled sidewalls which allow the shoe to engage with a receiver. The shoe for engagement with the butterfly clip utilizes an angled back surface, such as a 10° angle along the edge at the wide end of the dovetail shape, to engage with a butterfly clip when the shoe is inserted into the mounting receiver. The shoe with the pocket is secured within the mounting receiver with a retractable locking mount which moves into the pocket to engage with the shoe.

While both types of shoes have been used for some time, manufacturing a shoe that is successful with both the butterfly clip engagement and the pocket engagement has proved difficult. The shoe must be manufactured with extremely precise tolerances to allow the shoe to engage with the mounting receiver properly. Often times, a shoe with both types of engagement may fit with the butterfly clip but not fit with the pocket, or vice versa. It is often difficult for manufactures to control the tolerances needed for the butterfly clip engagement, and failing to do so can prevent proper mounting of the optical device. For example, if the tolerance between the angled edge of the shoe and the butterfly clip is too large, the shoe may be too loose within the mounting receiver, whereas if the tolerance is too small, the shoe may not lock within the mounting receiver at all, or the butterfly clip may become jammed and not allow the shoe to be released.

Another type of mounting device integral with an optical unit is the Legacy Mini-Universal Monocular (MUM) produced by Insight Technology. The Legacy MUM was used with night vision monoculars and was manufactured as a low cost alternative to military monoculars. The Legacy MUM is based upon a very simple and inexpensive molded plastic housing/chassis for the optics and relatively simple lens assemblies and removable battery housing. However, when the Legacy MUM was subjected to the conditions of in-field use, the plastic housing proved to be a weak and flimsy foundation in which the lenses and battery housing affix. The plastic housing, manufactured from soft, non-durable plastics, usually tear off with any hard use. As a result, the Legacy MUM failed to provide an adequate solution to many in-field uses.

A plate interface was supplied with many of the Legacy MUM devices in the marketplace. The original manufacturer of the Legacy MUM designed and supplied specific interface parts to fit with the interface plate. The parts are still in general global use today and are used to mount optics to mounting structures, such as, for example, to helmets, arms, weapon mounts, or in some cases interface devices to affix a secondary optic to the Legacy MUM. These interface plates were also manufactured from soft plastics and also tended to tear out and be discarded.

Thus, a heretofore unaddressed need exists in the industry to address the aforementioned deficiencies and inadequacies.

SUMMARY OF THE DISCLOSURE

Embodiments of the present disclosure provide a mounting shoe and related methods. Briefly described, in architecture, one embodiment of the mounting shoe, among others, can be implemented as follows. The mounting shoe has a shoe body. A base is connected to a bottom of the shoe body, the base having a channel formed through the base between a first side and a second side. A locking projection is removably positioned within a hole positioned through the shoe body and the base, wherein the hole extends from a top surface of the shoe body to a ceiling of the channel.

The present disclosure can also be viewed as providing a mounting shoe system. Briefly described, in architecture, one embodiment of the system, among others, can be implemented as follows. The mounting shoe system has an optical device having a chassis, wherein the chassis is formed from metal. A metal plate is attachable to the metal chassis. A shoe body has a base connected to a bottom of the shoe body, wherein the base has a channel formed through the base between a first side and a second side, wherein the shoe body and base are attachable to the metal plate by engaging rail edges of the metal plate with the channel. A locking projection is removably positioned within a hole positioned through the shoe body and the base, wherein the hole extends from a top surface of the shoe body to a ceiling of the channel, wherein the locking projection extends below an upper surface of the metal plate.

The present disclosure can also be viewed as providing methods of mounting an optical device. In this regard, one embodiment of such a method, among others, can be broadly summarized by the following steps: providing an optical device having a metal chassis, wherein a metal plate is attached to the metal chassis; mounting a shoe body and a base connected to a bottom of the shoe body to the metal plate by slidably engaging rail edges of the metal plate with a channel formed through the base between a first side and a second side; and locking the shoe body and the base to the metal plate by engaging a locking projection with the metal plate, wherein the locking projection is positioned within a hole positioned through the shoe body and the base, wherein the hole extends from a top surface of the shoe body to a ceiling of the channel, whereby the shoe body and base are prevented from moving in a direction along a length of the rail edges.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 14 is a flowchart illustrating a method of mounting an optical device, in accordance with the first exemplary embodiment of the present disclosure.

DETAILED DESCRIPTION

The subject disclosure is directed to an improved apparatus, system, and method for mounting optical devices to various mounting structures, and is further directed to providing a mounting device which can interface with existing technologies. While existing technologies, such as the Legacy MUM, have failed to be long-term, durable, and high-quality devices, many of their users have invested significantly in these technologies. These users are hesitant to purchase new mounting systems since it would require investing in costly new hardware. The subject disclosure may provide users with an improved device which interfaces with existing technology, overcomes the problems of the inferior plastic housing, and provides additional features.

Figure 1:
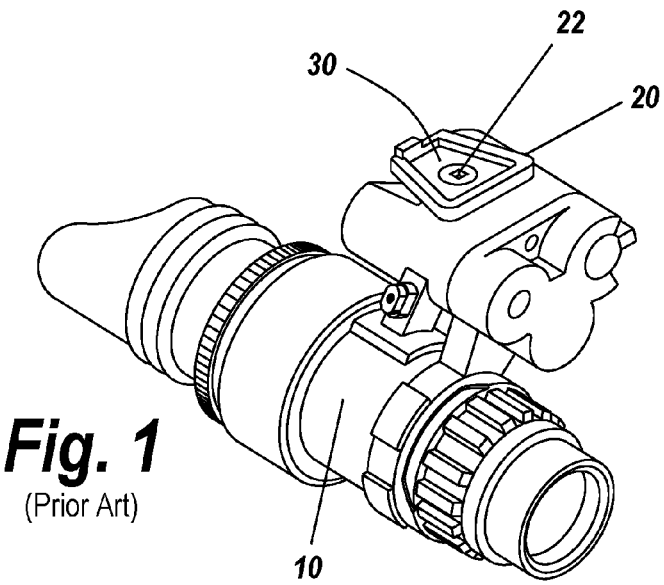
FIGS. 1-3 are illustrations of an optical device mounting system, in accordance with the prior art.
Figure 2:
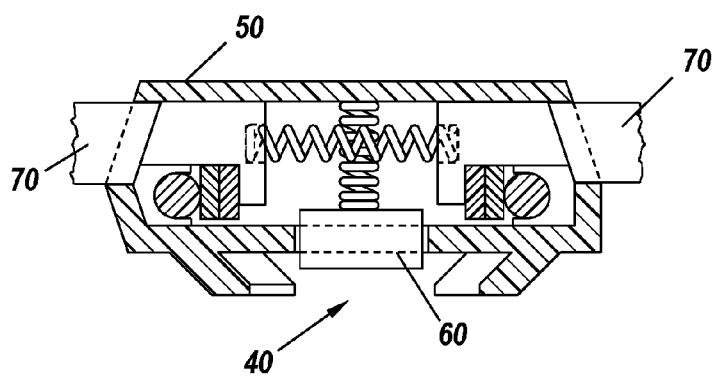
Figure 3:
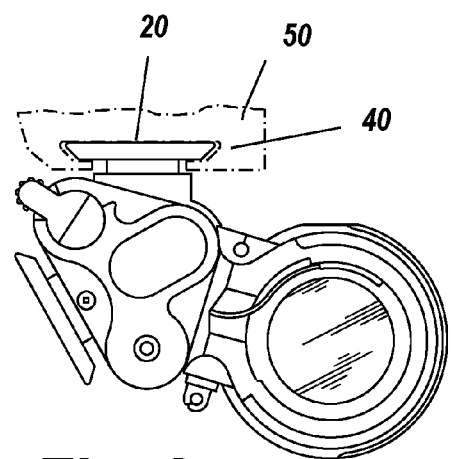
Figure 4A:
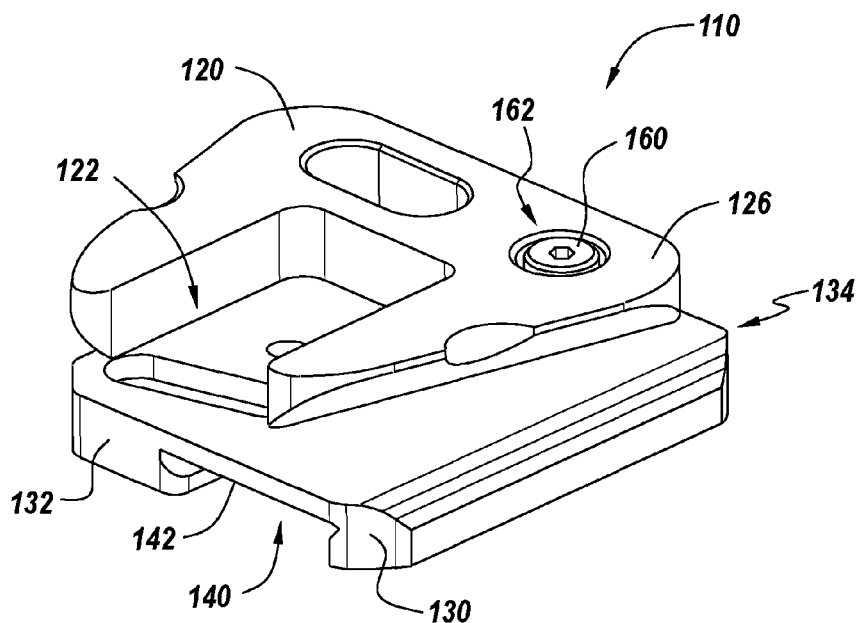
FIG. 4A is a plan view illustration of a mounting shoe, in accordance with a first exemplary embodiment of the present disclosure.
Figure 4B:
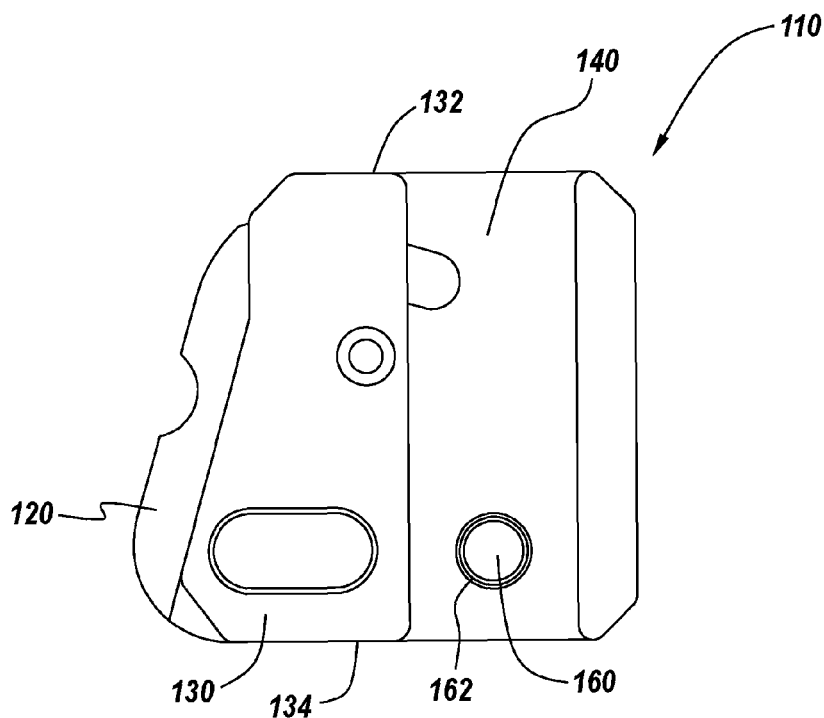
FIG. 4B is a bottom view illustration of a mounting shoe, in accordance with the first exemplary embodiment of the present disclosure.
Figure 4C:
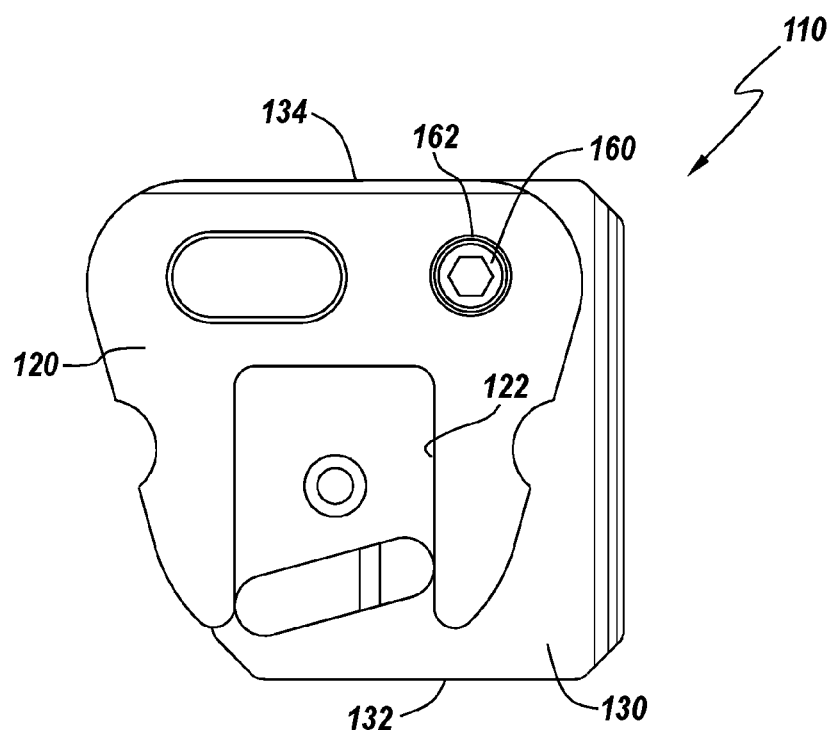
FIG. 4C is a top view illustration of a mounting shoe, in accordance with the first exemplary embodiment of the present disclosure.
Figure 4D:
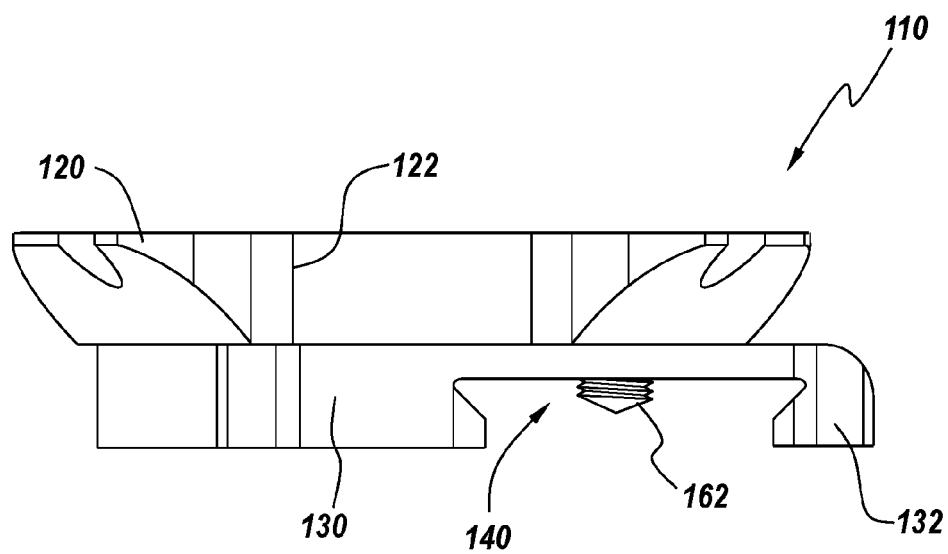
FIG. 4D is a side view illustration of a mounting shoe, in accordance with the first exemplary embodiment of the present disclosure.

FIG. 4A is a plan view illustration of a mounting shoe 110, in accordance with a first exemplary embodiment of the present disclosure. FIG. 4B is a bottom view illustration of a mounting shoe 110, in accordance with the first exemplary embodiment of the present disclosure. FIG. 4C is a top view illustration of a mounting shoe 110, in accordance with the first exemplary embodiment of the present disclosure. FIG. 4D is a side view illustration of a mounting shoe 110, in accordance with the first exemplary embodiment of the present disclosure. With reference to FIGS. 4A-4D, the mounting shoe 110, which may be referred to herein simply as 'shoe 110' includes a shoe body 120. A base 130 is connected to the shoe body 120. The base 130 has a channel 140 formed through the base 130 between a first side 132 and a second side 134. A locking projection 160 is removably positioned within a hole 162 positioned through the shoe body 120 and the base 130, wherein the hole 162 extends from a top surface 126 of the shoe body to a ceiling 142 of the channel 140. Movement of the locking projection 160 between the engaged and disengaged positions with the ceiling 142 of the channel 140 allows the lower end of the locking projection 160 to be positioned in nonintersecting and intersecting positions within the channel 140.

The shoe 110 may be used to retain mountable devices, such as optical devices, to a mounting structure, such as combat helmets, weapons, or other structures. The shoe 110 can be used with a variety of different optical devices that are well-known in the art, such as, for example, night vision monoculars. The shoe 110 may be used with a bridge or similar structure for connecting two or more optical devices together for use on a mounting structure, as detailed further herein. The shoe body 120 may be formed from a rigid, durable material, such as a metal or alloy, and generally has a dovetail shape where one side of the shoe body 120 is wider than another side, however other shaped shoe bodies 120 may be possible. As is shown in FIGS. 4A, 4C, and 4D, the shoe 120 may include a pocket 122 formed in the middle section of the shoe body 120 such that the shoe body 120 forms at least some of the edges of the pocket 122. The pocket 122 may have a variety of shapes, sizes, and depths. For example, the pocket 122 may have a rectangular shape formed by edge walls of the shoe body 120 with one or more open edges formed where the shoe body 120 is absent. The base of the pocket 122 may be a closed surface which is either integral with the shoe body 120 or affixed to the shoe body 120. For example, some shoe bodies 120 may have a structure that provides a pocket 122 base surface, while other shoe bodies 120 may be used with other mounting components, such as base plates, to provide the base surface of the pocket 122. As described in commonly-owned applications, the mounting shoe 110 may include other features, such as a pocket insert and at least one fastener that allows the pocket insert to be secured within the pocket 122.

The base 130 is connected to an underside of the shoe body 120, such as by integrally forming or manufacturing the shoe body 120 to the base 130, although other construction and manufacturing techniques can be employed. The channel 140 of the base 130 may be an open pathway defined by structures of the base 130 which is sized to receive a mounting bar on a bridge, or similar mounting structure, as will be later described. The channel 140 commonly is connected between opposing edges of the base 130, such as between a first side 132 on a front of the mounting shoe 110 and a second side 134 on a rear end of the mounting shoe 110. The channel 140 may be offset from the base 130 and/or shoe body 120, such that a center line of the channel 140 is laterally offset from a center line of the base 130 or shoe body 120.

The locking projection 160 may include a threaded fastener such as a set screw or similar screw, which is positioned within the hole 162. The locking projection 160 may have threaded sides which engage with the internal threaded sidewalls of the hole 162. When the locking projection 160 is positioned far enough within the hole 162, the end of the locking projection 160 may extend into the channel 140, for example, past a ceiling 142 of the channel 140, such that the locking projection 160, at least in part, is in an intersecting position with the channel 140. When the locking projection 160 is removed upwards, the lower end of the locking projection 160 may be removed from the channel 140 and not intersect with the channel 140.

In use, as will be described herein, the locking projection 160 may be used to removably lock the shoe body 120 and base 130 to a mounting bar 170 (FIG. 7-8C) to retain the shoe body 120 and base 130 to an optical device.

Figure 5:
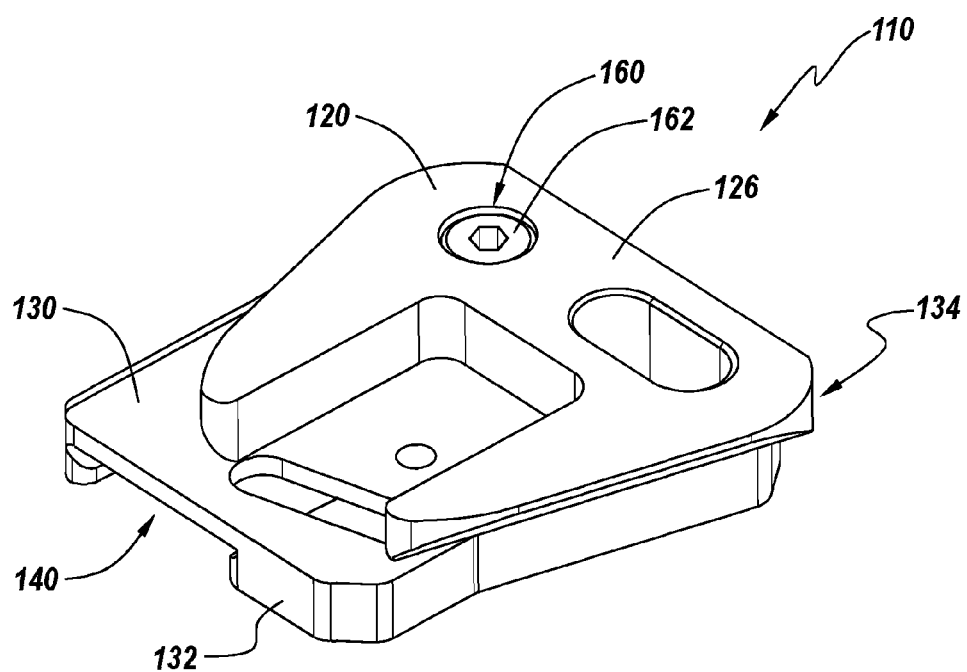
FIG. 5 is a plan view illustration of a mounting shoe, in accordance with the first exemplary embodiment of the present disclosure.

FIG. 5 is a plan view illustration of a mounting shoe 110, in accordance with the first exemplary embodiment of the present disclosure. As will be described herein, the mounting shoe 110 may include structures which can be used on either the left or right sides of a bridge or other mounting structure. FIGS. 4A-4D detail the left-hand mounted mounting shoe 110. FIG. 5 illustrates the right-hand mounted mounting shoe 110, which has materially similar, and in some cases, identical, structures to the left-hand mounted mounting shoe 110. Accordingly, as shown in FIG. 5, the right-hand mounted mounting shoe 110 includes a shoe body 120. A base 130 is connected to the shoe body 120. The base 130 has a channel 140 formed through the base 130 between a first side 132 and a second side 134. The locking projection 160 is removably positioned within the hole 162 positioned through the shoe body 120 and the base 130, wherein the hole 162 extends from a top surface 126 of the shoe body to a ceiling 142 of the channel 140. Movement of the locking projection 160 between the engaged and disengaged positions with the ceiling 142 of the channel 140 allows the lower end of the locking projection 160 to be positioned in nonintersecting and intersecting positions within the channel 140.

Figure 6:
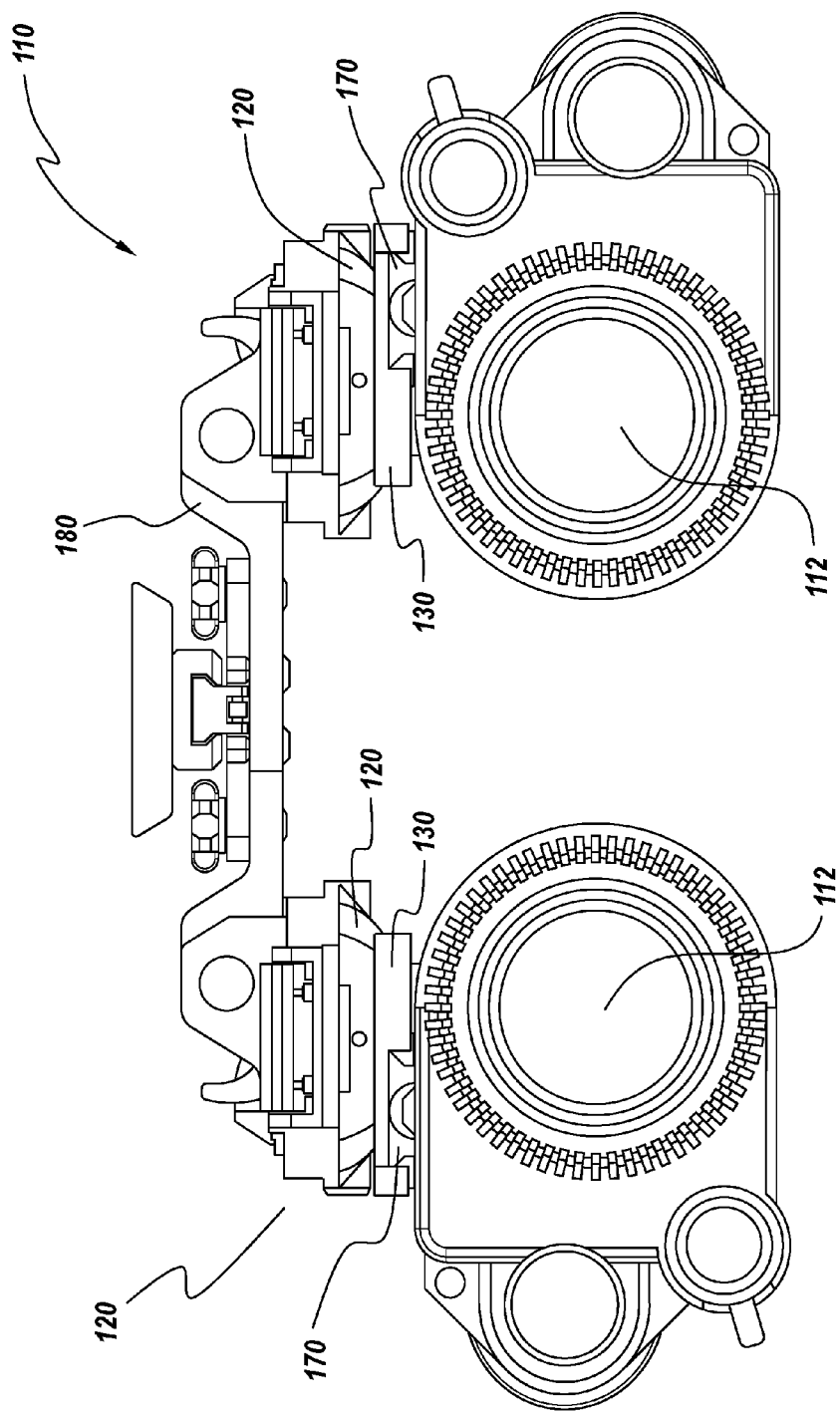
FIG. 6 is a front view illustration of a mounting shoe in use with a bridge and optical device, in accordance with the first exemplary embodiment of the present disclosure.

FIG. 6 is a front view illustration of a mounting shoe 110 in use with a bridge 180 and optical device 112, in accordance with the first exemplary embodiment of the present disclosure. The mounting shoe 110 (or two mounting shoes 110, as shown) can be used to mount optical devices 112 to a bridge 180, which can then be used to mount the optical devices 112 to a helmet with a single connection (uppermost dovetailed shoe body). FIG. 6 illustrates in detail the engagement between the mounting shoe 110 and the optical devices 112. The optical devices 112 may have a metal chassis that provides a durable connection point for the mounting system. As shown, the mounting shoe 110 is positioned under each side of the bridge 180 and facilitates the engagement to the optical device 112 on either side of the bridge 180. That engagement is created using a mounting bar 170 which can be affixed to the optical device 112 and which can be received within the channel 140 of the mounting shoe 110.

Figure 7:
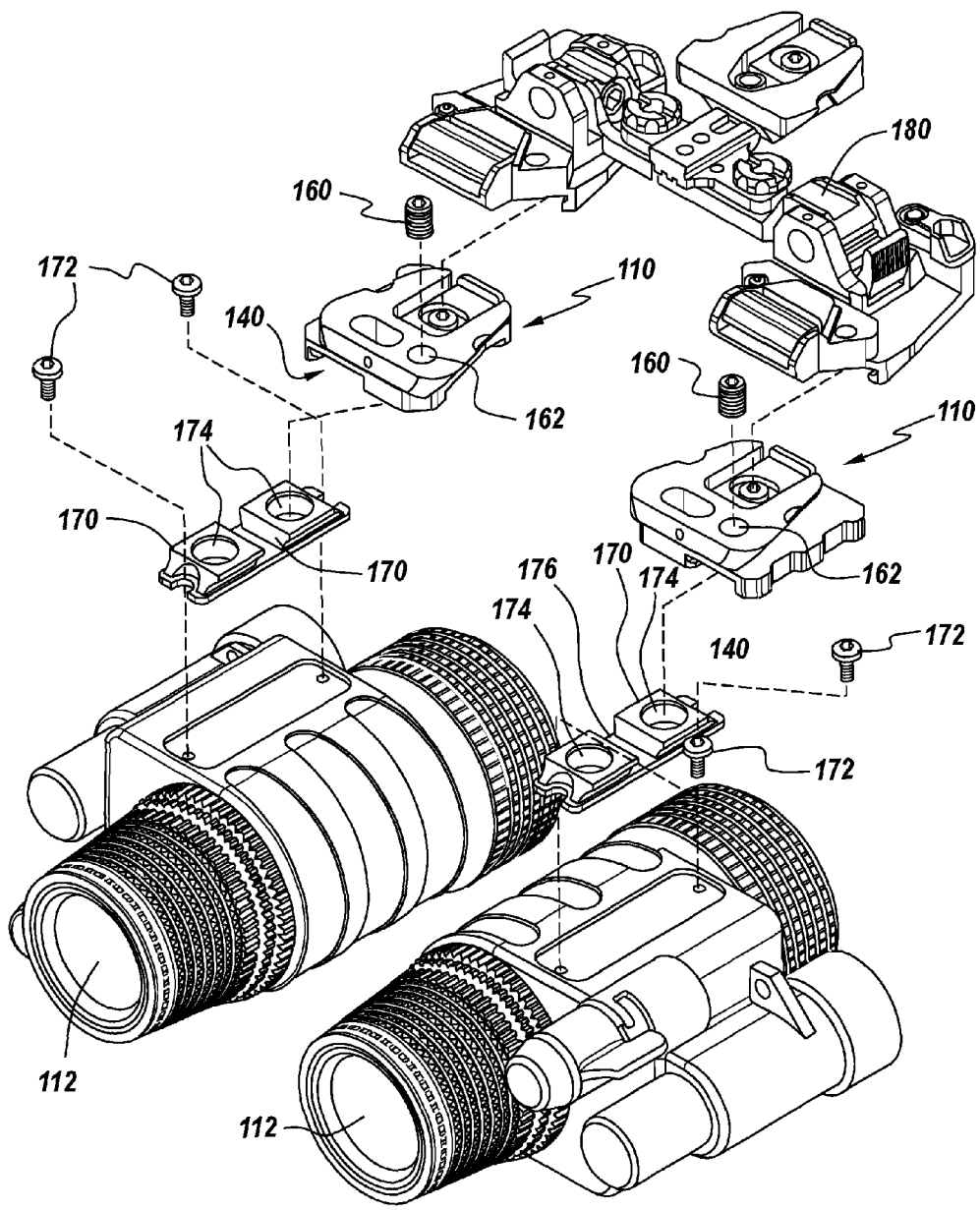
FIG. 7 is an exploded isometric view illustration of a mounting shoe in use with a bridge and optical device, in accordance with the first exemplary embodiment of the present disclosure.

FIG. 7 is an exploded isometric view illustration of a mounting shoe 110 in use with a bridge 180 and optical device 112, in accordance with the first exemplary embodiment of the present disclosure. Here, the use of the mounting bar 170 with the optical devices 112 and the mounting shoes 110 can be readily seen. A mounting bar 170 may be affixed to each optical device 112 along a top side with fasteners, such as threaded fasteners 172. The threaded fasteners 172 may be engagable with full or partial holes on the edges of the mounting bar 170. As shown, the mounting bar 170 also includes at least two circular cavities 174 and a slot cavity 176. The circular cavities 174 are cavities for receiving a threaded screw (not shown) which acts as a sealing structure for the internal parts of the optical device 112. The threaded screw can be removed to give access to the internal parts of the optical device 112 to purge it with gas or other substances, or for similar purposes. Conventionally, the circular cavities 174 are not cavities that engage with other devices. The slot cavity 176, on the other hand, is conventionally used for engagement with latches of conventional mounting devices.

Once the mounting bar 170 is affixed to the optical device 112 with the threaded fasteners 172, the mounting shoe 110 may be engaged with the mounting bar 170. This engagement occurs through the angled sidewall edges of channel 140 of the mounting shoe 110 receiving the rail edges of the mounting bar 170, which is aligned with the edge opening of the channel 140 such that the two structures can be moved laterally to one another to position the mounting bar 170 fully or partially within the channel 140. The angled sidewall edges of the channel 140 may be matched to closely engage with the rail edges of the mounting bar 170. For example, the angled edges may have a wider distance therebetween proximate to a ceiling of the channel 140 and a closer distance therebetween near the lower edge of the base 130, where the rail of the mounting bar 170 is wide at the top thereof and slopes inward near the bottom of the mounting bar 170. As the mounting bar 170 is moved into the channel 140, the locking projection 160 can be inserted into the hole 162 and can be received in either one of the two circular cavities 174 or within the slot cavity 176, depending on the design. When the locking projection 160 engages with one or more of the cavities, the mounting bar 170 may be fixedly retained within the channel 140, since the mounting bar 170 is prevented from movement in all directions by either the locking protrusion or the sidewalls and/or ceiling of the channel 140.

Figure 8A:
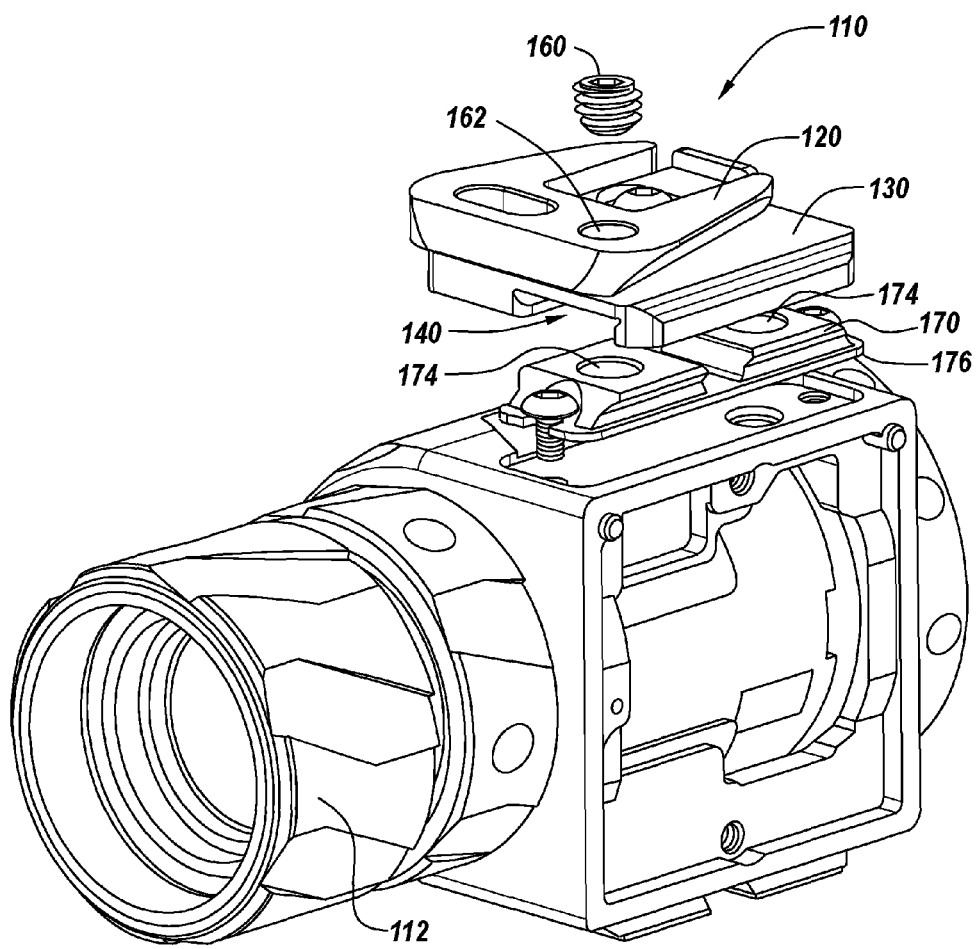
FIGS. 8A-8B are isometric view illustrations of a mounting shoe in various stages of engagement with an optical device having a mounting bar, in accordance with the first exemplary embodiment of the present disclosure.
Figure 8B:
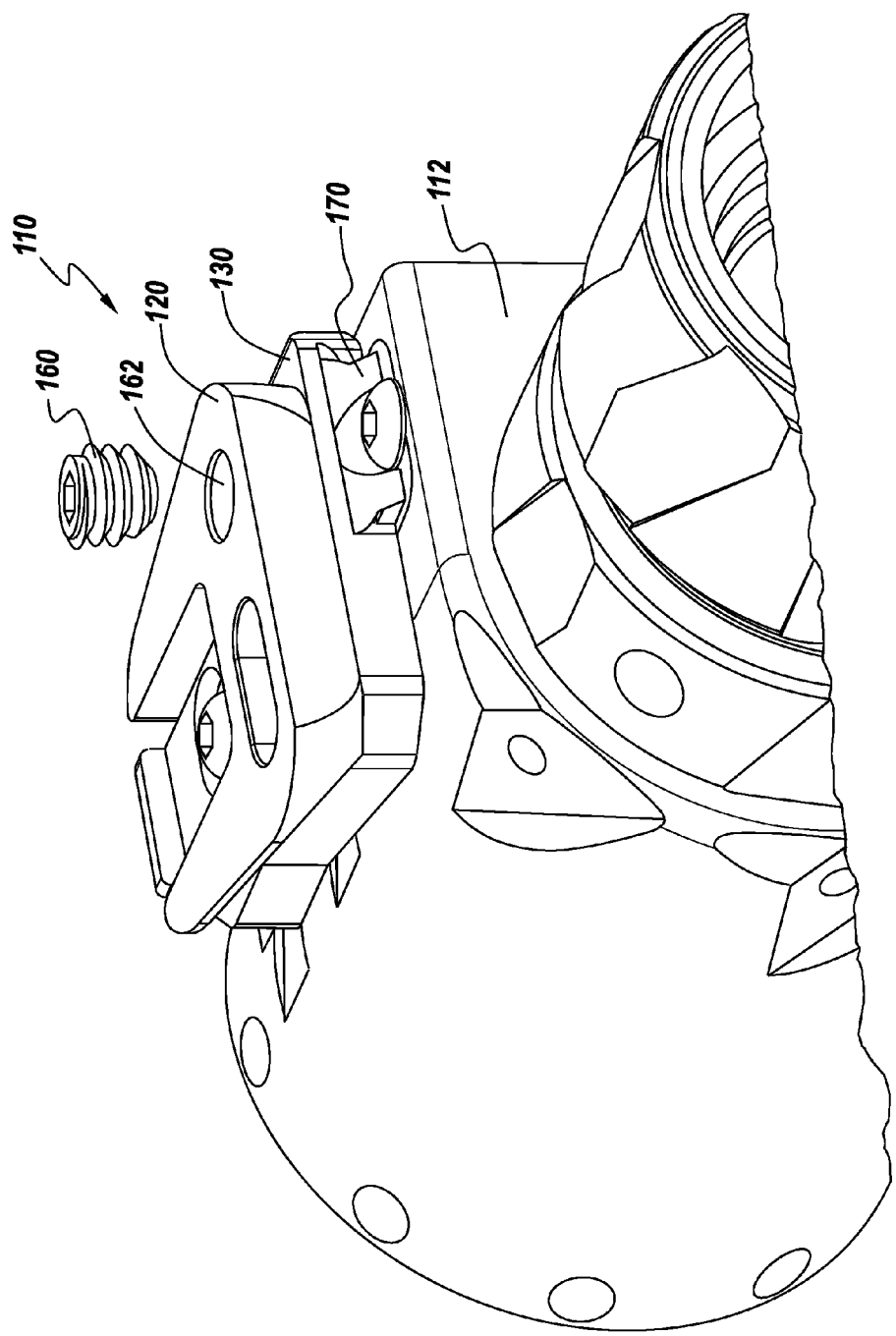
Figure 8C:
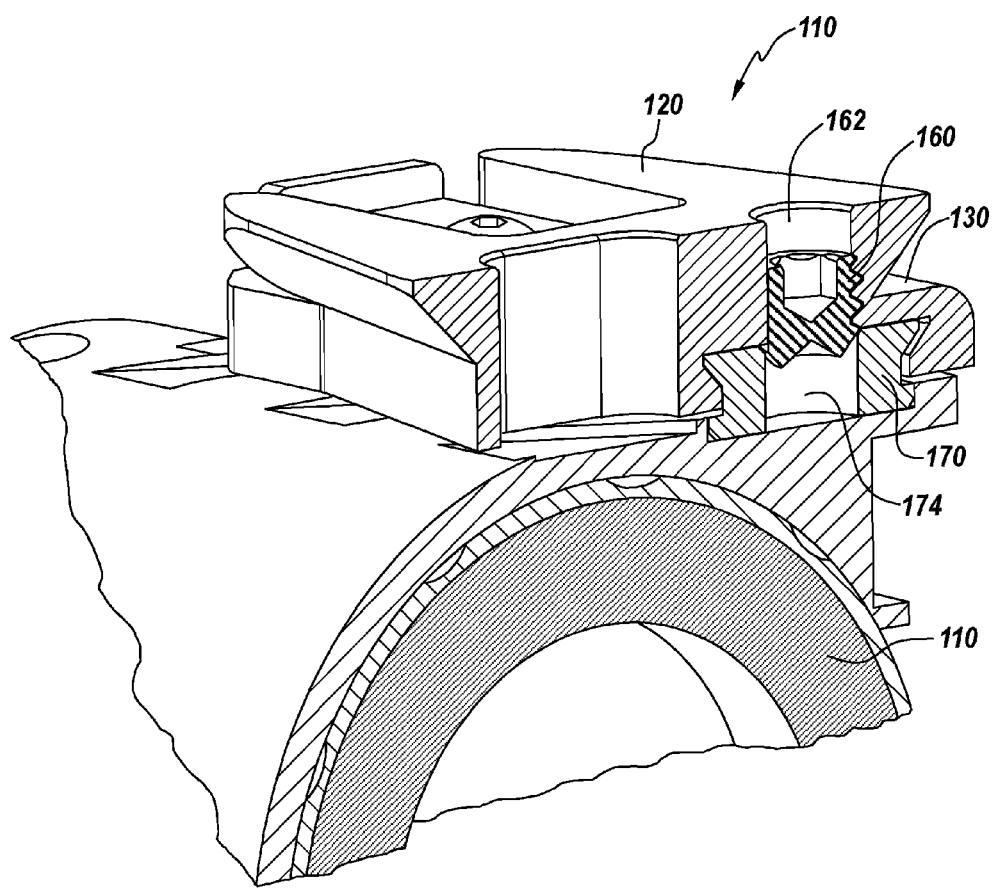
FIG. 8C is a cross-sectional view illustration of a mounting shoe engaged with an optical device having a mounting bar, in accordance with the first exemplary embodiment of the present disclosure.

FIGS. 8A-8B are isometric view illustrations of a mounting shoe 110 in various stages of engagement with an optical device having a mounting bar 170, in accordance with the first exemplary embodiment of the present disclosure. FIG. 8C is a cross-sectional view illustration of a mounting shoe 110 engaged with an optical device having a mounting bar 170, in accordance with the first exemplary embodiment of the present disclosure. Specifically, FIGS. 8A-8C illustrate one side of the dual optical device assembly shown in FIG. 7 in various stages of engagement of the mounting shoe 110 with the mounting bar 170. In FIG. 8A, the mounting shoe 110 is positioned above the mounting bar 170. The angular sides of the mounting bar 170, positioned on the sides of the circular cavities 174 and the cavity slot 176, can be seen in detail. The angular sides are positioned to match with the internal angular sidewalls of the channel 140, as shown. In FIG. 8B, the mounting shoe 110 is shown positioned on the mounting bar 170 but where the locking projection 160 is not positioned in a locking position. In non-locked position, the locking projection 160 is nonintersecting with the channel 140, which allows the mounting bar 170 to be moved into the channel 140 without obstruction. To lock the shoe body 120 in place on the mounting bar 170, the locking projection 160 can be placed within the hole 162 until it descends low enough to contact the circular cavity 174 (FIG. 8A). In this locked position, the locking projection 160 intersects with the channel 140 and the circular cavity 174, which retains the shoe body 120 on the mounting bar 170 in a static, fixed position. In FIG. 8C, the cross-sectional engagement of the locking projection 160 with the circular cavity 174 of the mounting bar 170 can be seen. As the locking projection 160 is at least partially inserted into the circular cavity 174, sliding movement along the mounting bar 170 can be prevented, such that the mounting shoe 110 can be retained and locked to the optical device 112 successfully.

An important feature of the subject disclosure is the use of a metal chassis on the optical device 112. The use of a metal chassis on the optical device 112 in combination with a metal mounting bar 170 ensures there will be a durable, quality connection between the mounting bar 170 and the optical device 112. In contrast, the prior art uses a plastic chassis such that when the metal plate is secured to the plastic housing with two self-piloting short screws, these short screws are driven straight into plastic, which provides little resistance to stripping and shearing forces. Essentially, the plate tears out by hand when any levered force is applied. This problem is overcome by the use of the metal chassis in the optical device 112. Longer screws may be used by the subject disclosure to securely fasten the mounting bar 170 (interface plate) to the metal chassis. The new metal chassis of the optical device 112 may have shock isolation inserts which allows conventional equipment to be utilized in many dynamic and convertible user formats not previously possible without the use of the stronger exo-skeletal. In one example, generally speaking, the lenses and battery module of the optical device 112 may be removed from the plastic housing along with the image tube, and the metal chassis may be installed, which allows these components to be retrofitted onto the new housing.

Relative to the prior art, it is noted that the subject disclosure may be used with existing devices. It is noted that the subject disclosure may use a mounting bar 170 which is interchangeable with the Legacy MUM interface plate. Likewise, the mounting shoe 110, as described herein, can operate with existing Legacy MUM interface plates, thereby providing an interface to new age hardware that previously did not interface with conventional plates. A user could also use a device with a mounting shoe 110 on one side of their helmet to use for modern equipment, retain the Legacy system on the other side of the helmet for Legacy hardware based on the logistical dynamics. In any case the user can use just the Legacy interface via the plate, one plate and one MUM Clip if desired, or both legacy plates can be covered with dual/opposing MUM Clips.

Figure 9A:
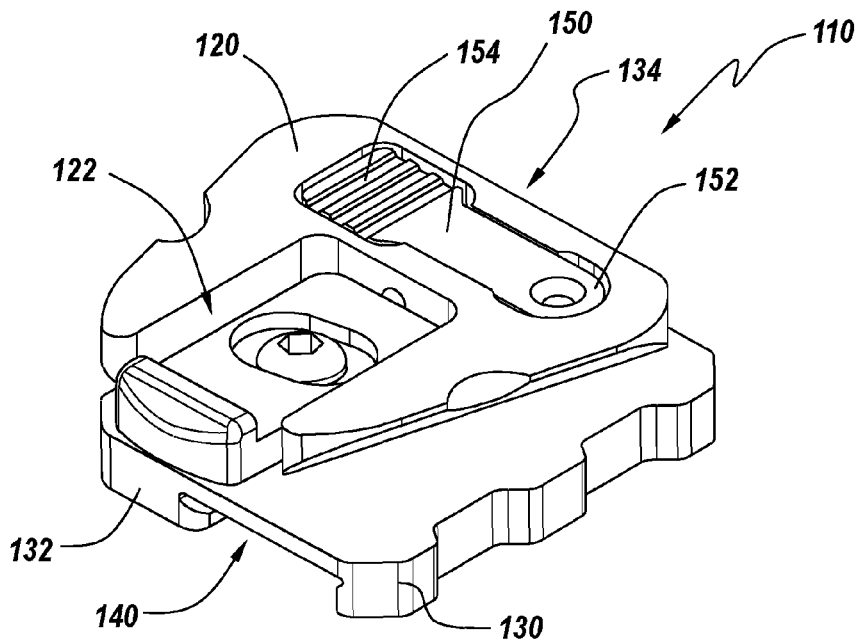
FIG. 9A is a plan view illustration of a mounting shoe, in accordance with a first exemplary embodiment of the present disclosure.
Figure 9B:
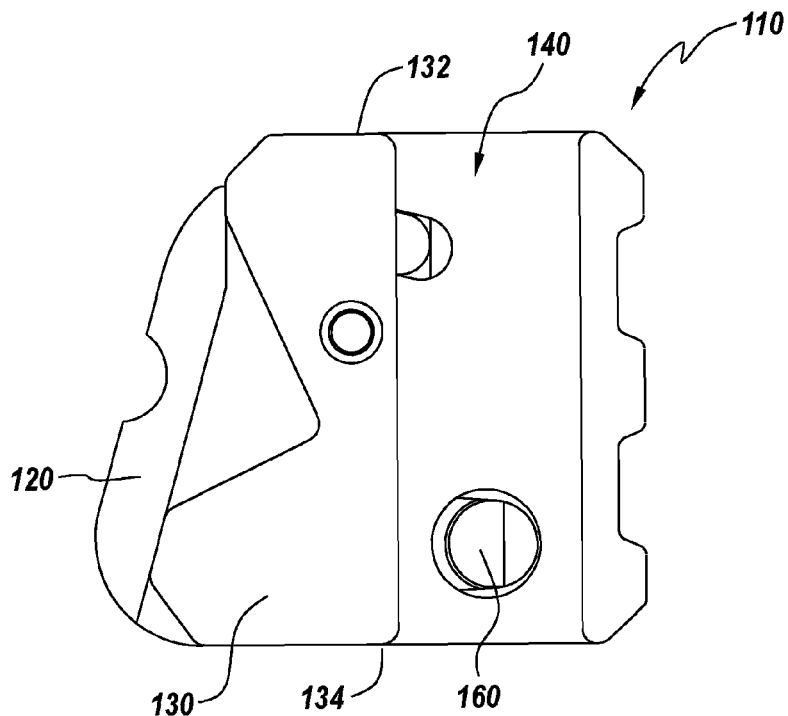
FIG. 9B is a bottom view illustration of a mounting shoe, in accordance with the first exemplary embodiment of the present disclosure.
Figure 9C:
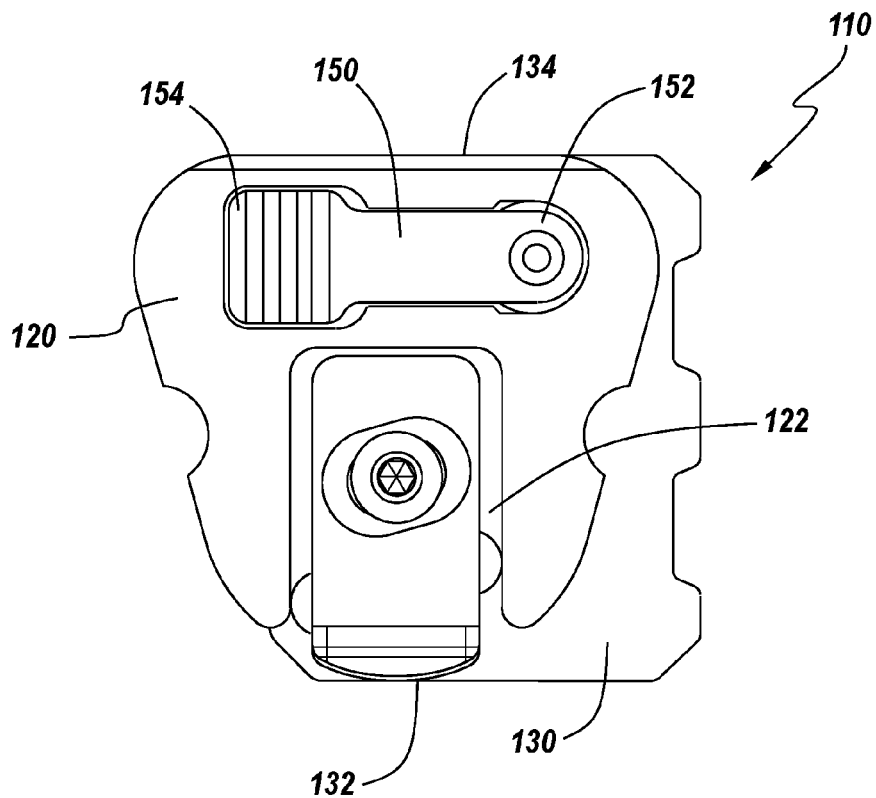
FIG. 9C is a top view illustration of a mounting shoe, in accordance with the first exemplary embodiment of the present disclosure.
Figure 9D:
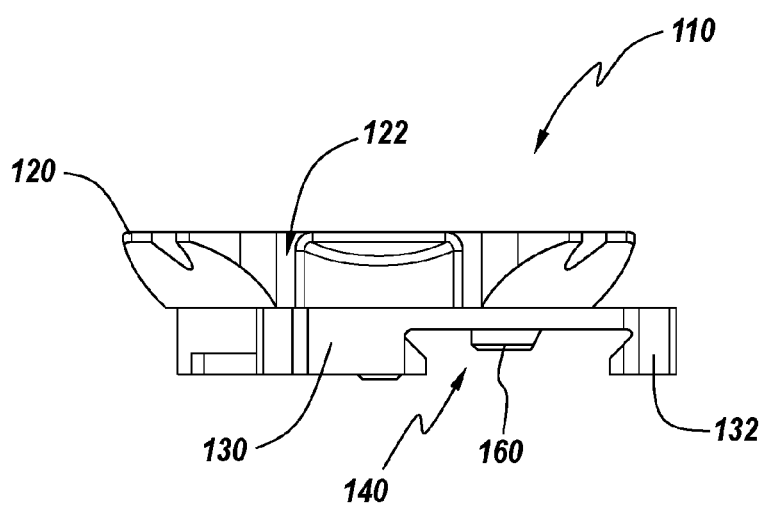
FIG. 9D is a side view illustration of a mounting shoe, in accordance with the first exemplary embodiment of the present disclosure.

FIG. 9A is a plan view illustration of a mounting shoe 110, in accordance with a first exemplary embodiment of the present disclosure. FIG. 9B is a bottom view illustration of a mounting shoe 110, in accordance with the first exemplary embodiment of the present disclosure. FIG. 9C is a top view illustration of a mounting shoe 110, in accordance with the first exemplary embodiment of the present disclosure. FIG. 9D is a side view illustration of a mounting shoe 110, in accordance with the first exemplary embodiment of the present disclosure. With reference to FIGS. 9A-9D, the mounting shoe 110, which may be referred to herein simply as 'shoe 110' includes a shoe body 120. A base 130 is connected to the shoe body 120. The base 130 has a channel 140 formed through the base 130 between a first side 132 and a second side 134. A biased lever 150 is positioned within at least a portion of the shoe body 120, wherein the biased lever 150 is movable between an unlocked position and a locked position. A locking projection 160 is positioned on an underside of the biased lever 150, wherein movement of the biased lever 150 between the unlocked and locked positions moves the locking projection 160 between nonintersecting and intersecting positions within the channel 140.

The shoe 110 may be used to retain mountable devices, such as optical devices, to a mounting structure, such as combat helmets, weapons, or other structures. The shoe 110 can be used with a variety of different optical devices that are well-known in the art, such as, for example, night vision monoculars. The shoe 110 may be used with a bridge or similar structure for connecting two or more optical devices together for use on a mounting structure, as detailed further herein. The shoe body 120 may be formed from a rigid, durable material, such as a metal or alloy, and generally has a dovetail shape where one side of the shoe body 120 is wider than another side, however other shaped shoe bodies 120 may be possible. As is shown in FIGS. 9A, 9C, and 9D, the shoe 120 may include a pocket 122 formed in the middle section of the shoe body 120 such that the shoe body 120 forms at least some of the edges of the pocket 122. The pocket 122 may have a variety of shapes, sizes, and depths. For example, the pocket 122 may have a rectangular shape formed by edge walls of the shoe body 120 with one or more open edges formed where the shoe body 120 is absent. The base of the pocket 122 may be a closed surface which is either integral with the shoe body 120 or affixed to the shoe body 120. For example, some shoe bodies 120 may have a structure that provides a pocket 122 base surface, while other shoe bodies 120 may be used with other mounting components, such as base plates, to provide the base surface of the pocket 122. As described in commonly-owned applications, the mounting shoe 110 may include other features, such as a pocket insert and at least one fastener that allows the pocket insert to be secured within the pocket 122.

The base 130 is connected to an underside of the shoe body 120, such as by integrally forming or manufacturing the shoe body 120 to the base 130, although other construction and manufacturing techniques can be employed. The channel 140 of the base 130 may be an open pathway defined by structures of the base 130 which is sized to receive a mounting bar on a bridge, or similar mounting structure, as will be later described. The channel 140 commonly is connected between opposing edges of the base 130, such as between a first side 132 on a front of the mounting shoe 110 and a second side 134 on a rear end of the mounting shoe 110.

The biased lever 150 may be mounted within an inset cavity of the shoe body 120 such that a top edge of the biased lever 150 is positioned flush or substantially flush with a top surface of the shoe body 120. The biased lever 150 may be characterized as having at least two ends: a locking end 152 which is positioned on the side of the locking projection 160 and an actuating end 154 which is positioned on an opposing side from the locking projection 160. The actuating end 154 is the end which is pushed or actuated by a user to allow the biased lever 150 to pivot about a pivot point (positioned between the locking and actuating ends 152, 154), and subsequently move the locking end 152. As is shown, the actuating end 154 may include a textured surface, such as knurling or ribs, which allow it to be easily actuated by a user's fingers.

The biased lever 150 may be biased using a spring or similar biasing mechanism, such that it is a spring-loaded lever. The biasing mechanism may be designed to force the biased lever 150 between the unlocked and locked positions, one of which may be considered a home position (where the biased lever 150 remains when no force is acting on it). Thus, the biased lever 150 may naturally be positioned in one of the unlocked and locked positions. Commonly, the natural position will be the locked position (shown in FIG. 9D), such that the biased lever 150 must be acted upon in order to remove it from the locked position. The unlocked and locked positions may be understood based on the position of the locking projection 160 in the channel 140 in either nonintersecting or intersecting positions with the channel 140. For example, when the locking projection 160 positioned on the underside of the biased lever 150, is intersecting the channel 140, as shown in FIG. 9D, the biased lever 150 may be considered to be in the locking position. In contrast, when the actuating end 154 of the biased lever 150 is actuated, the biased lever 150 may pivot to withdraw the locking projection 160 from the channel 140, such that the locking projection 160 is free, or substantially free, from intersection with the channel 140.

Figure 10:
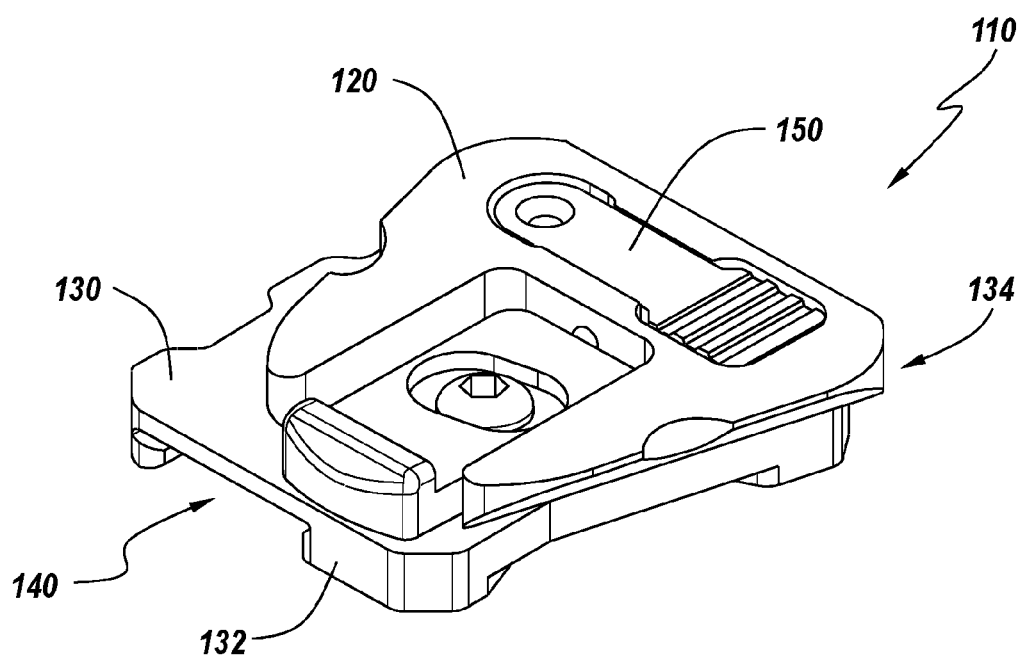
FIG. 10 is a plan view illustration of a mounting shoe, in accordance with the first exemplary embodiment of the present disclosure.

FIG. 10 is a plan view illustration of a mounting shoe 110, in accordance with the first exemplary embodiment of the present disclosure. As will be described herein, the mounting shoe 110 may include structures which can be used on either the left or right sides of a bridge or other mounting structure. FIGS. 9A-9D detail the left-hand mounted mounting shoe 110. FIG. 10 illustrates the right-hand mounted mounting shoe 110, which has materially similar, and in some cases, identical, structures to the left-hand mounted mounting shoe 110. Accordingly, as shown in FIG. 10, the right-hand mounted mounting shoe 110 includes a shoe body 120. A base 130 is connected to the shoe body 120. The base 130 has a channel 140 formed through the base 130 between a first side 132 and a second side 134. A biased lever 150 is positioned within at least a portion of the shoe body 120, wherein the biased lever 150 is movable between an unlocked position and a locked position. A locking projection 160 is positioned on an underside of the biased lever 150, wherein movement of the biased lever 150 between the unlocked and locked positions moves the locking projection 160 between nonintersecting and intersecting positions within the channel 140.

Figure 11A:
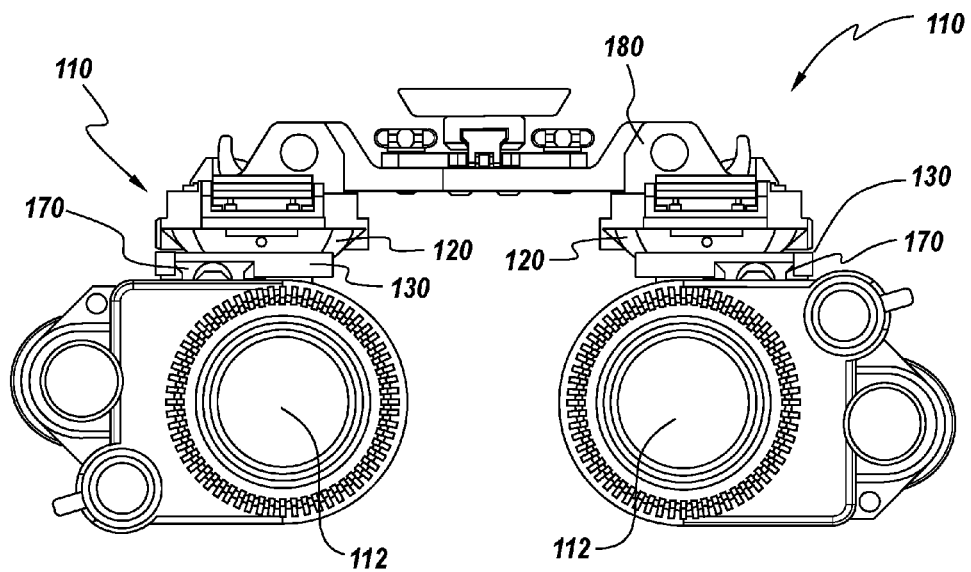
FIG. 11A is a front view illustration of a mounting shoe in use with a bridge and optical device, in accordance with the first exemplary embodiment of the present disclosure.
Figure 11B:
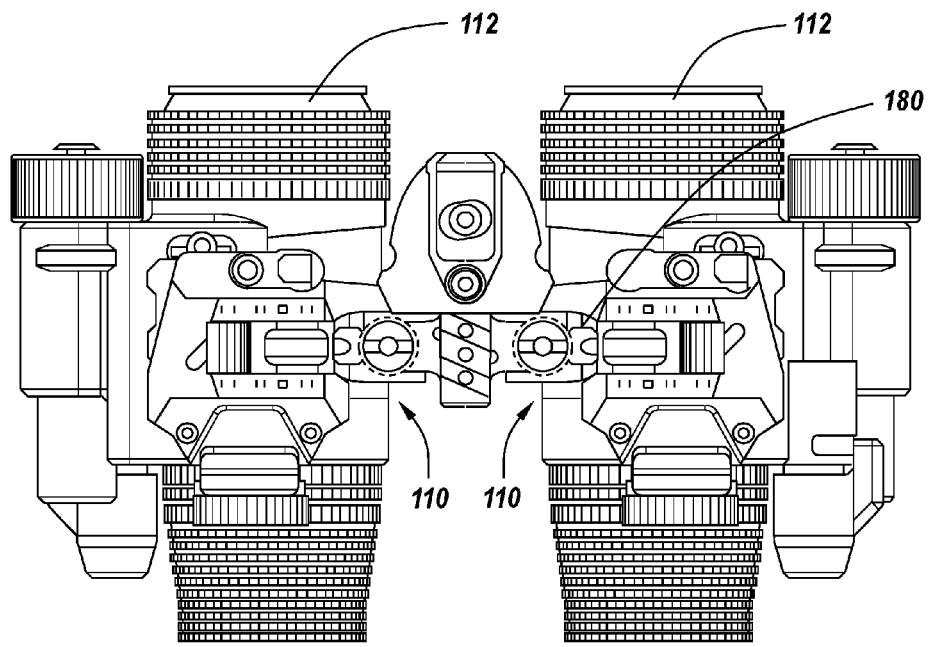
FIG. 11B is a top view illustration of a mounting shoe in use with a bridge and optical device, in accordance with the first exemplary embodiment of the present disclosure.

FIG. 11A is a front view illustration of a mounting shoe 110 in use with a bridge 180 and optical device 112, in accordance with the first exemplary embodiment of the present disclosure. —FIG. 11B is a top view illustration of a mounting shoe 110 in use with a bridge 180 and optical device 112, in accordance with the first exemplary embodiment of the present disclosure. With reference to FIG. 11B first, the mounting shoe 110 (or two mounting shoes 110, as shown) can be used to mount optical devices 112 to a bridge 180, which can then be used to mount the optical devices 112 to a helmet with a single connection (upper-most dovetailed shoe body). FIG. 11A illustrates in detail the engagement between the mounting shoe 110 and the optical devices 112. As shown, the mounting shoe 110 is positioned under each side of the bridge 180 and facilitates the engagement to the optical device 112 on either side of the bridge 180. That engagement is created using a mounting bar 170 which can be affixed to the optical device 112 and which can be received within the channel 140 of the mounting shoe 110. In accordance with this disclosure, the mounting bar 170 may be characterized as a type of mounting shoe which uses angled edges to be received within a slot or channel.

Figure 12:
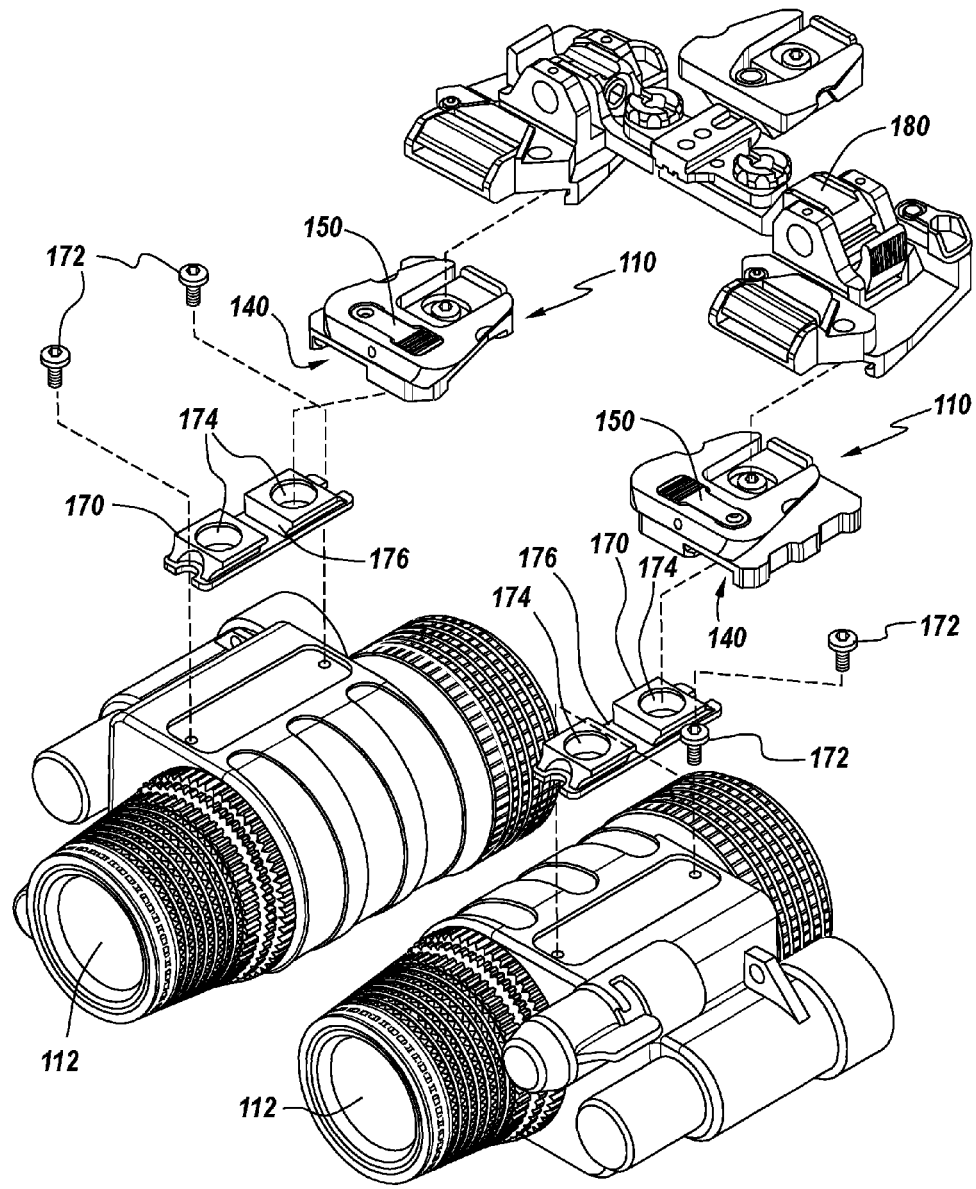
FIG. 12 is an exploded isometric view illustration of a mounting shoe in use with a bridge and optical device, in accordance with the first exemplary embodiment of the present disclosure.

FIG. 12 is an exploded isometric view illustration of a mounting shoe 110 in use with a bridge 180 and optical device 112, in accordance with the first exemplary embodiment of the present disclosure. Here, the use of the mounting bar 170 with the optical devices 112 and the mounting shoes 110 can be readily seen. A mounting bar 170 may be affixed to each optical device 112 along a top side with fasteners, such as threaded fasteners 172. The threaded fasteners 172 may be engagable with full or partial holes on the edges of the mounting bar 170. As shown, the mounting bar 170 also includes at least two circular cavities 174 and a slot cavity 176. The circular cavities 174 are cavities for receiving a threaded screw (not shown) which acts as a sealing structure for the internal parts of the optical device 112. The threaded screw can be removed to give access to the internal parts of the optical device 112 to purge it with gas or other substances, or for similar purposes. Conventionally, the circular cavities 174 are not cavities that engage with other devices. The slot cavity 176, on the other hand, is conventionally used for engagement with latches of conventional mounting devices.

Once the mounting bar 170 is affixed to the optical device 112 with the threaded fasteners 172, the mounting shoe 110 may be engaged with the mounting bar 170. This engagement occurs through the channel 140 of the mounting shoe 110 receiving the mounting bar 170, which is aligned with the edge opening of the channel 140 such that the two structures can be moved laterally to one another to position the mounting bar 170 fully or partially within the channel 140. As the mounting bar 170 is moved into the channel 140, the locking protrusion (not visible) on the biased lever 150 can be received in either one of the two circular cavities 174 or within the slot cavity 176, depending on the design. When the locking protrusion engages with one or more of the cavities, the mounting bar 170 may be fixedly retained within the channel 140, since the locking bar 170 is prevented from movement in all directions by either the locking protrusion or the sidewalls and/or ceiling of the channel 140.

Figure 13A:
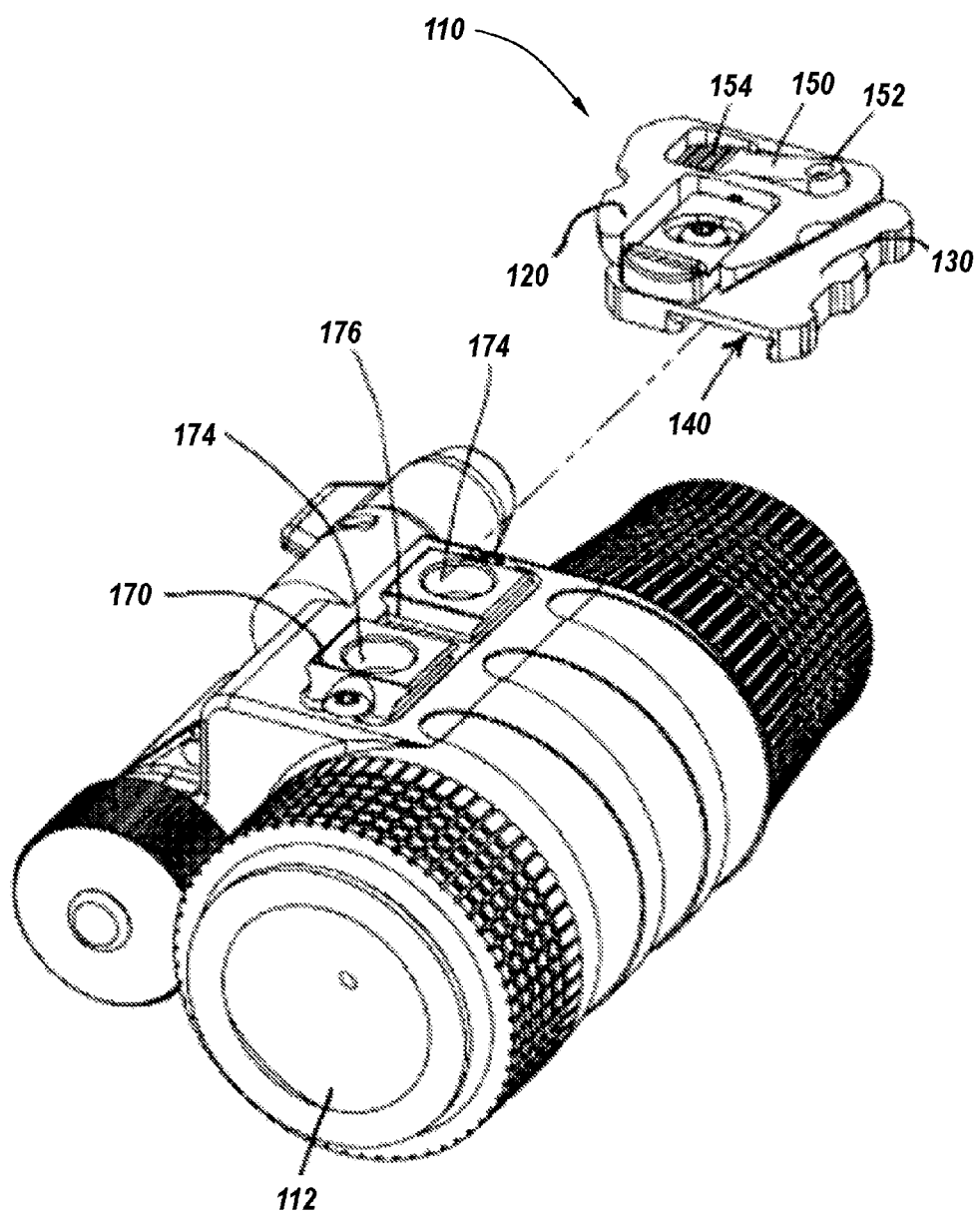
FIGS. 13A-13D are isometric view illustrations of a mounting shoe in various stages of engagement with an optical device having a mounting bar, in accordance with the first exemplary embodiment of the present disclosure.
Figure 13B:
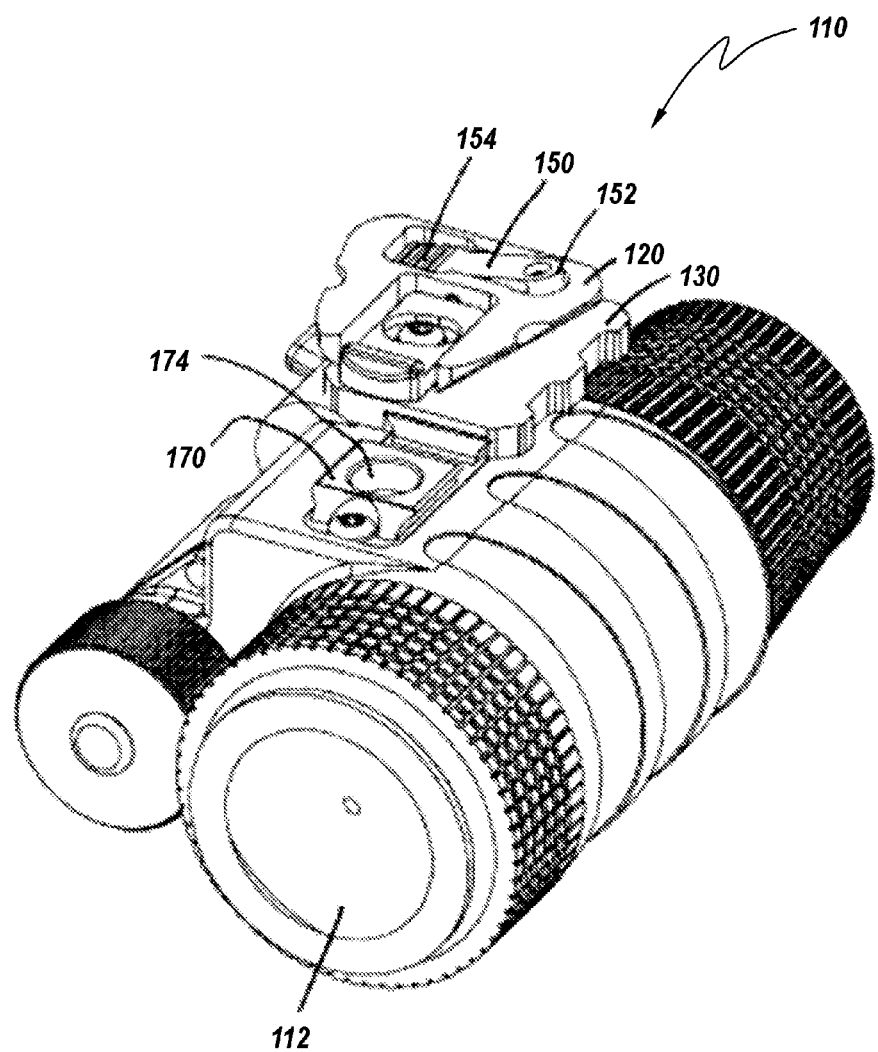

FIGS. 13A-13D are isometric view illustrations of a mounting shoe 110 in various stages of engagement with an optical device having a mounting bar 170, in accordance with the first exemplary embodiment of the present disclosure. FIG. 13E is a cross-sectional view illustration of a mounting shoe 110 engaged with an optical device having a mounting bar 170, in accordance with the first exemplary embodiment of the present disclosure. Specifically, FIGS. 13A-13E illustrate one side of the dual optical device assembly shown in FIG. 12 in various stages of engagement of the mounting shoe 110 with the mounting bar 170. In FIG. 13A, the mounting shoe 110 is positioned in alignment with the mounting bar 170, such that the mounting bar 170 is positioned to be received within the channel 140 of the mounting shoe 110. The angular sides of the mounting bar 170, positioned on the sides of the circular cavities 174 and the cavity slot 176, can be seen in detail. The angular sides are positioned to match with the internal angular sidewalls of the channel 140, as shown. In FIG. 13B, the mounting shoe 110 is shown partially engaged with the mounting bar 170, where the mounting bar 170 is about half positioned within the channel 140. As can be seen in FIGS. 13A-13B, the biased lever 150 is positioned with the actuating end 154 down, thereby retaining the locking end 152 in a raised position. In the raised position, the locking projection (not visible) is nonintersecting with the channel 140, which allows the mounting bar 170 to be moved into the channel 140 without obstruction.

Figure 13C:
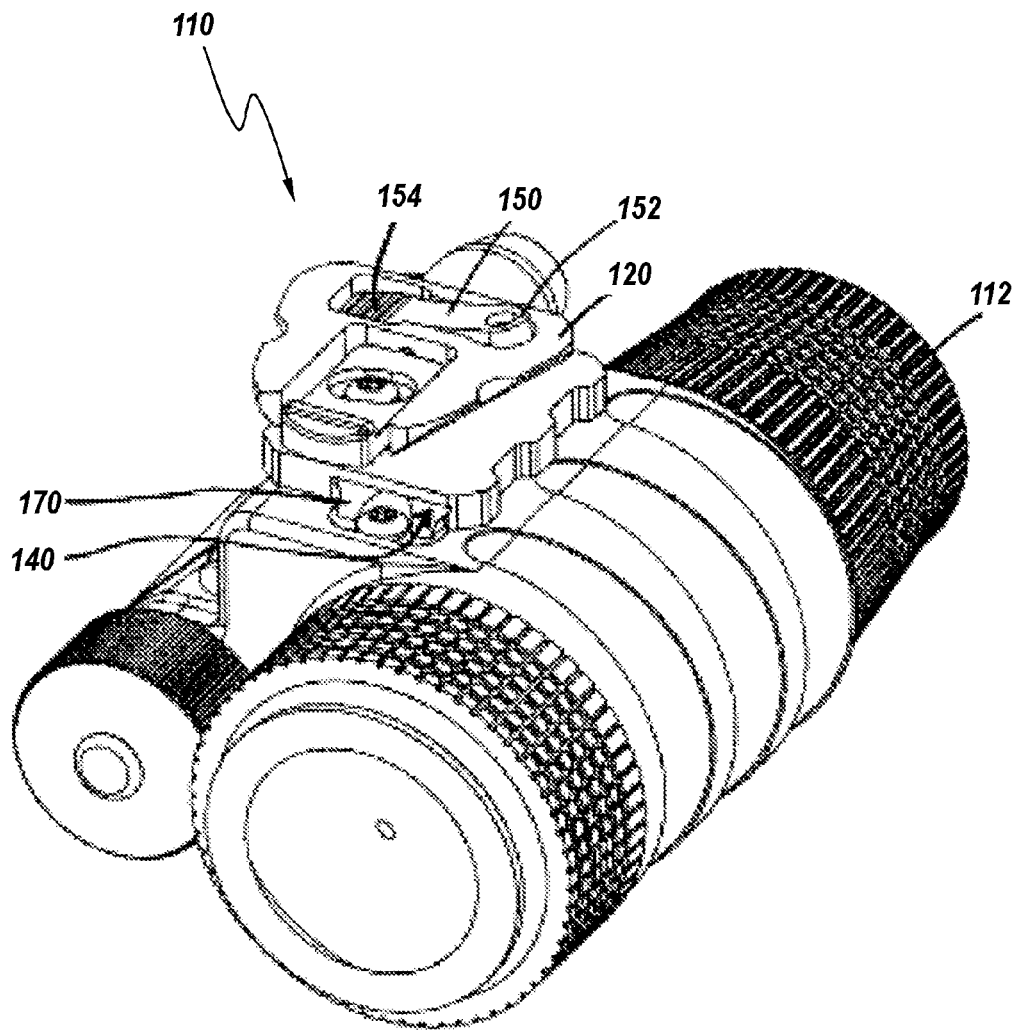
Figure 13D:
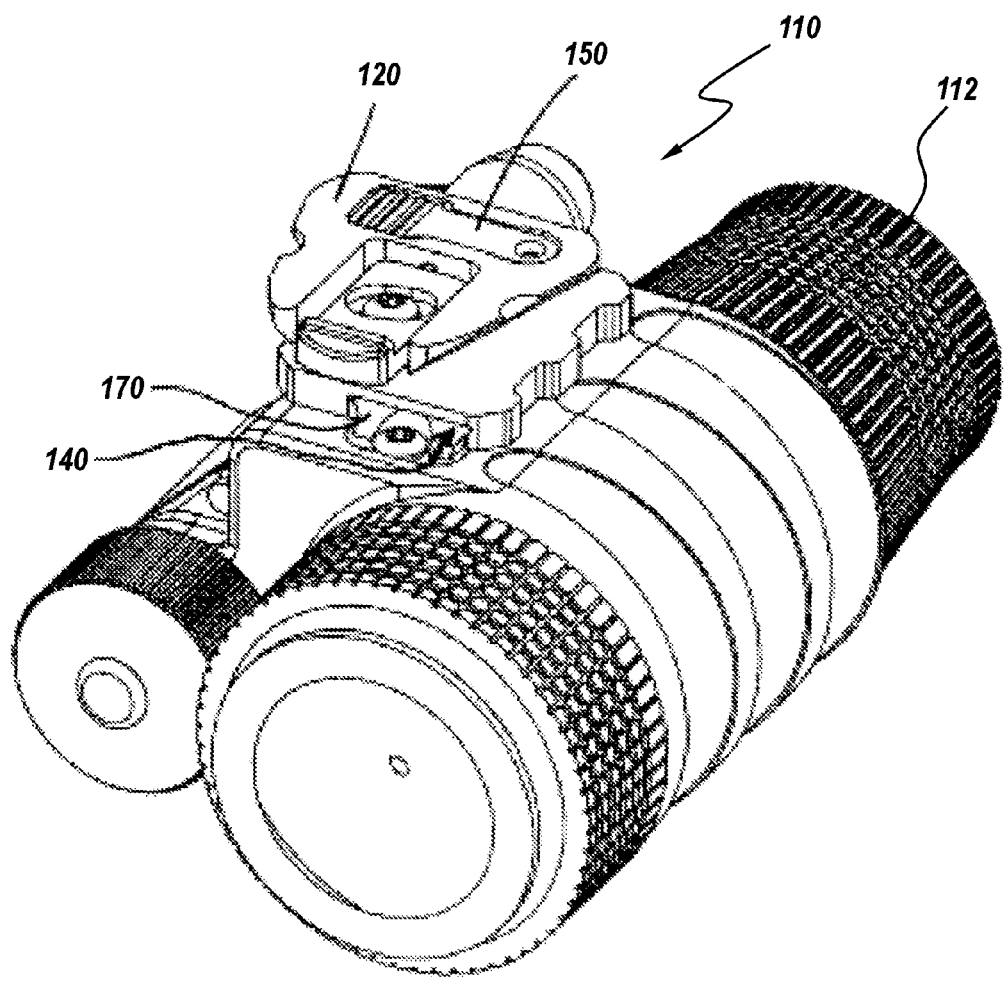
Figure 13E:
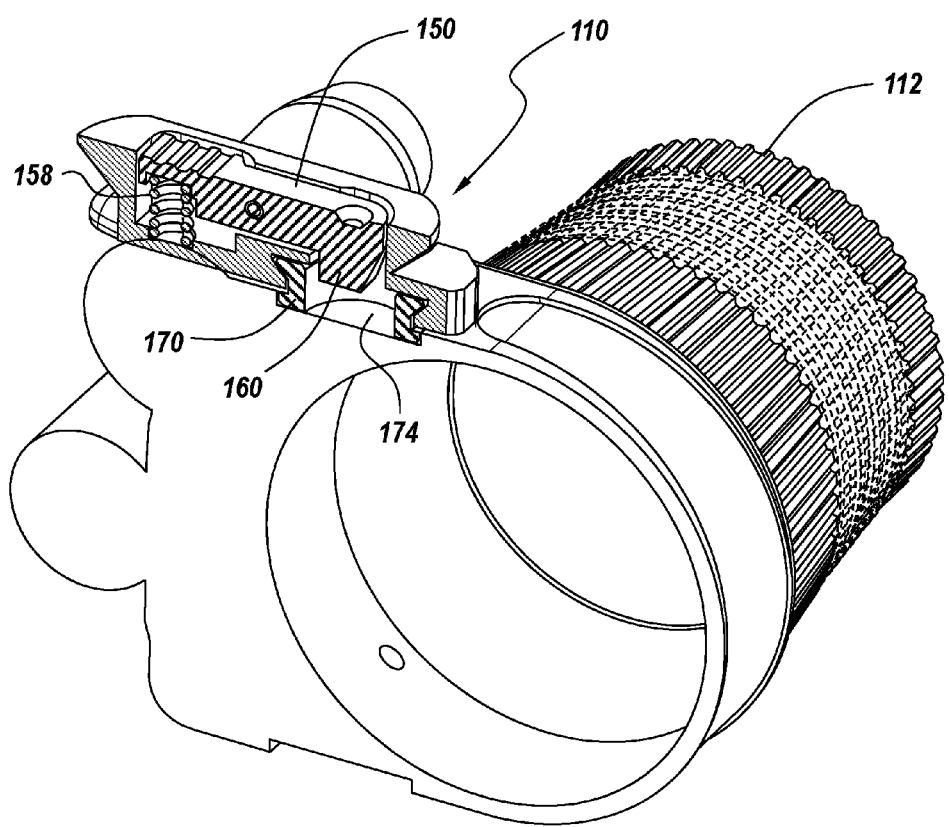
FIG. 13E is a cross-sectional view illustration of a mounting shoe engaged with an optical device having a mounting bar, in accordance with the first exemplary embodiment of the present disclosure.

In FIG. 13C, the mounting shoe 110 is positioned fully on the mounting bar 170, such that the mounting bar 170 is almost fully received in the channel 140. It is noted, depending on the length of the mounting bar 170, parts of it may extend beyond the edges of the channel 140 when the mounting bar 170 is within the channel 140. Again, the biased lever 150 is positioned with the actuating end 154 down, thereby retaining the locking end 152 in a raised position. In FIG. 13D, the biased lever 150 is positioned with the actuating end 154 flush with the top surface of the shoe body 120, which has moved the locking end 152 from the raised position (FIGS. 13A-13C) to the locked position, such that the locking protrusion is engaged with the circular cavity or cavity slot of the mounting bar 170. In this position, the mounting bar 170 may be retained within the channel 140. In FIG. 13E, the cross-sectional engagement of the locking protrusion 160 with the circular cavity 174 of the mounting bar 170 can be seen. As shown, the biased lever 150 is acted upon by the spring 158 to force the locking protrusion 160 into the circular cavity 174 of the mounting bar 170, which retains and locks the mounting shoe 110 to the optical device 112 successfully.

FIG. 14 is a flowchart 200 illustrating a method of mounting an optical device, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, an optical device having a metal chassis is provided, wherein a metal plate is attached to the metal chassis. A shoe body and a base connected to a bottom of the shoe body are mounted to the metal plate by slidably engaging rail edges of the metal plate with a channel formed through the base between a first side and a second side (block 204). The shoe body and the base are locked to the metal plate by engaging a locking projection with the metal plate, wherein the locking projection is positioned within a hole positioned through the shoe body and the base, wherein the hole extends from a top surface of the shoe body to a ceiling of the channel, whereby the shoe body and base are prevented from moving in a direction along a length of the rail edges (block 206).

The method may include any additional number of steps, features, or functions, including any disclosed within this disclosure. For example, the locking projection may further comprise a threaded set screw, wherein locking the shoe body and the base to the metal plate further comprises rotating the threaded set screw to a position where the threaded set screw is positioned at least partially below an upper surface of the metal plate. In this situation, rotating the threaded set screw to at least partially occupy an open cavity formed within the metal plate may move the threaded set screw into a locked position. In one of many alternatives, locking the shoe body and the base to the metal plate may further comprise actuating a biased lever having a nonthreaded projection from an unlocked position to a locked position, wherein the biased lever is positioned within at least a portion of the shoe body. In either situation, the rail edges of the metal plate may be slidably engaged with the channel by sliding the channel in a direction substantially perpendicular to a central axis of the hole. Once the connections are secure, the shoe body may be mounted to a mounting structure, such as a combat helmet or weapon.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A mounting shoe comprising:
   a shoe body;
   a base connected to a bottom of the shoe body, the base having a channel formed through the base between a first side and a second side, wherein a center line of the channel is offset from a center line of the base; and
   a locking projection removably positioned within a hole positioned through the shoe body and the base, wherein the hole extends from a top surface of the shoe body to a ceiling of the channel.

2. The mounting shoe of claim 1, wherein the locking projection further comprises a threaded screw, and wherein the threaded screw is engagable with a threaded, internal sidewall of the hole.

3. The mounting shoe of claim 2, wherein the threaded screw further comprises a set screw.

4. The mounting shoe of claim 2, wherein the threaded screw is positioned fully below the top surface of the shoe body.

5. The mounting shoe of claim 1, wherein the locking projection is movable between engaged and disengaged positions, wherein in the engaged position, the locking projection is at least partially intersecting the channel, and wherein in the disengaged position, the locking projection is non-intersecting the channel.

6. The mounting shoe of claim 1, wherein a center line of the channel is offset from a center line of the shoe body.

7. The mounting shoe of claim 1, wherein the channel further comprises at least first and second angled sidewalls, wherein a first distance between the first and second angled sidewalls at a location proximate to the ceiling of the channel is greater than a second distance between the first and second angled sidewalls at a location proximate to a bottom surface of the base.

8. The mounting shoe of claim 1, wherein the locking projection further comprises a non-threaded projection formed on a biased lever, wherein the biased lever is positioned within at least a portion of the shoe body, wherein the biased lever is movable between an unlocked position and a locked position, and wherein movement of the biased lever between the unlocked and locked positions moves the non-threaded locking projection between nonintersecting and intersecting positions within the channel.

9. A mounting shoe system comprising:
   an optical device having a chassis, wherein the chassis is formed from metal;
   a metal plate attachable to the metal chassis;
   a shoe body and a base connected to a bottom of the shoe body, wherein the base has a channel formed through the base between a first side and a second side, wherein the shoe body and base are attachable to the metal plate by engaging rail edges of the metal plate with the channel; and
   a locking projection removably positioned within a hole positioned through the shoe body and the base, wherein the hole extends from a top surface of the shoe body to a ceiling of the channel, wherein the locking projection extends below an upper surface of the metal plate.

10. The mounting shoe system of claim 9, wherein the locking projection further comprises a threaded set screw, and wherein the threaded screw is engagable with a threaded, internal sidewall of the hole.

11. The mounting shoe system of claim 1, wherein a center line of the channel is offset from a center line of the base and a center line of the shoe body.

12. The mounting shoe system of claim 1, wherein the channel further comprises at least first and second angled sidewalls, wherein the rail edges of the metal plate are slidably engagable with the first and second angled sidewalls.

13. The mounting shoe system of claim 1, wherein the locking projection further comprises a non-threaded projection formed on a biased lever, wherein the biased lever is positioned within at least a portion of the shoe body, wherein the biased lever is movable between an unlocked position and a locked position, and wherein movement of the biased lever between the unlocked and locked positions moves the non-threaded locking projection between nonintersecting and intersecting positions within the metal plate.

14. A method of mounting an optical device, the method comprising:
    providing an optical device having a metal chassis, wherein a metal plate is attached to the metal chassis;
    mounting a shoe body and a base connected to a bottom of the shoe body to the metal plate by slidably engaging rail edges of the metal plate with a channel formed through the base between a first side and a second side; and
    locking the shoe body and the base to the metal plate by engaging a locking projection with the metal plate, wherein the locking projection is positioned within a hole positioned through the shoe body and the base, wherein the hole extends from a top surface of the shoe body to a ceiling of the channel, whereby the shoe body and base are prevented from moving in a direction along a length of the rail edges.

15. The method of claim 14, wherein the locking projection further comprises a threaded set screw, wherein locking the shoe body and the base to the metal plate further comprises rotating the threaded set screw to a position where the threaded set screw is positioned at least partially below an upper surface of the metal plate.

16. The method of claim 14, further comprising rotating the threaded set screw to at least partially occupy an open cavity formed within the metal plate, wherein the open cavity has an opening facing a ceiling of the channel.

17. The method of claim 14, wherein locking the shoe body and the base to the metal plate further comprises actuating a biased lever having a non-threaded projection from an unlocked position to a locked position, wherein the biased lever is positioned within at least a portion of the shoe body.

18. The method of claim 14, wherein slidably engaging the rail edges of the metal plate with the channel further comprises sliding the channel in a direction substantially perpendicular to a central axis of the hole.

19. The method of claim 14, further comprising mounting the shoe body to a mounting structure, wherein the mounting structure further comprises a helmet.

* * * * *